US010204353B2

(12) United States Patent
Freeman et al.

(10) Patent No.: US 10,204,353 B2
(45) Date of Patent: Feb. 12, 2019

(54) COPY DETECTION USING EXTINSIC FEATURES

(71) Applicant: CertiRx, Inc., Research Triangle Park, NC (US)

(72) Inventors: Darrell Jerome Freeman, Research Triangle Park, NC (US); Thomas J. Mercolino, Chapel Hill, NC (US); Hersh Ashok Tapadia, Research Triangle Park, NC (US); Robert Brooks Stephenson, Raleigh, NC (US); Xue Feng, Raleigh, NC (US); Michael Brown, Raleigh, NC (US)

(73) Assignee: CertiRx, Inc., Research Triangle Park, NC (US)

( * ) Notice: Subject to any disclaimer, the term of this patent is extended or adjusted under 35 U.S.C. 154(b) by 71 days.

(21) Appl. No.: 15/009,778

(22) Filed: Jan. 28, 2016

(65) Prior Publication Data
US 2016/0267510 A1 Sep. 15, 2016

Related U.S. Application Data

(60) Provisional application No. 62/108,654, filed on Jan. 28, 2015.

(51) Int. Cl.
*G06Q 30/02* (2012.01)

(52) U.S. Cl.
CPC ............... *G06Q 30/0207* (2013.01)

(58) Field of Classification Search
CPC ....... H04L 9/3247; G06F 21/31; G06F 21/44; G06F 3/048; G06F 3/04883; H04W 12/06; H04W 12/08; G06Q 30/0248; G06Q 30/0207
See application file for complete search history.

(56) References Cited

U.S. PATENT DOCUMENTS

| | | | | |
|---|---|---|---|---|
| 6,393,138 B1* | 5/2002 | Chai | ................... | G06K 9/00154 340/5.82 |
| 6,567,530 B1* | 5/2003 | Keronen | ................... | G09C 5/00 382/100 |
| 7,002,704 B1* | 2/2006 | Fan | ....................... | G06F 21/608 358/1.14 |
| 8,556,164 B1* | 10/2013 | Freedman | .......... | G06Q 30/0207 235/375 |
| 2001/0036297 A1* | 11/2001 | Ikegami | ................. | G06F 21/32 382/115 |

(Continued)

*Primary Examiner* — Carol Wang
(74) *Attorney, Agent, or Firm* — NK Patent Law

(57) ABSTRACT

The subject matter described herein includes methods, systems, and computer program products for performing extrinsic copy detection and authentication of items. According to one method, an arrangement of symbols is generated. The symbols may include a variety of letters, groups of letters, characters, or pictures that are used instead of a word or a group of words. The arrangement of symbols are printed on an item which may hereinafter be referred to as the original or authentic item. A representation of the arrangement of symbols is captured after being printed on the original item. A registration signature is generated based on the captured arrangement of symbols. The registration signature is then stored in a database, such as a secure, central electronic database.

21 Claims, 29 Drawing Sheets

(56) References Cited

U.S. PATENT DOCUMENTS

| | | | |
|---|---|---|---|
| 2002/0012445 A1* | 1/2002 | Perry | G06Q 10/00 382/100 |
| 2002/0049614 A1* | 4/2002 | Rice | G06F 19/327 705/3 |
| 2003/0045353 A1* | 3/2003 | Paulsen | G07F 17/32 463/40 |
| 2003/0074315 A1* | 4/2003 | Lam | G06Q 20/042 705/42 |
| 2004/0039914 A1* | 2/2004 | Barr | G06T 1/0028 713/176 |
| 2005/0129282 A1* | 6/2005 | O'Doherty | G07D 7/121 382/112 |
| 2005/0182656 A1* | 8/2005 | Morey | G06Q 50/22 705/2 |
| 2006/0117182 A1* | 6/2006 | Wolff | G06F 21/64 713/176 |
| 2007/0028107 A1* | 2/2007 | Cowburn | G06F 19/322 713/172 |
| 2008/0002243 A1* | 1/2008 | Cowburn | G06K 7/14 358/498 |
| 2008/0005579 A1* | 1/2008 | Gaines | G06F 21/32 713/186 |
| 2008/0016358 A1* | 1/2008 | Filreis | H04L 63/123 713/176 |
| 2008/0222042 A1* | 9/2008 | Moore | G06F 19/3456 705/55 |
| 2009/0087077 A1* | 4/2009 | Nireki | G07D 7/12 382/135 |
| 2009/0141944 A1* | 6/2009 | Abe | G06K 9/00 382/115 |
| 2009/0185713 A1* | 7/2009 | Koike | G06F 21/608 382/100 |
| 2011/0012711 A1* | 1/2011 | Abe | G06F 21/32 340/5.82 |
| 2012/0048923 A1* | 3/2012 | Wakebe | G06K 7/10821 235/380 |
| 2012/0230555 A1* | 9/2012 | Miura | G06K 9/00087 382/124 |
| 2012/0263343 A1* | 10/2012 | Simske | G06K 9/00577 382/100 |
| 2012/0273564 A1* | 11/2012 | Mercolino | G07D 7/004 235/375 |
| 2013/0022238 A1* | 1/2013 | Wood | G07D 7/2033 382/103 |
| 2014/0160298 A1* | 6/2014 | Johnson | H04N 5/33 348/164 |

* cited by examiner

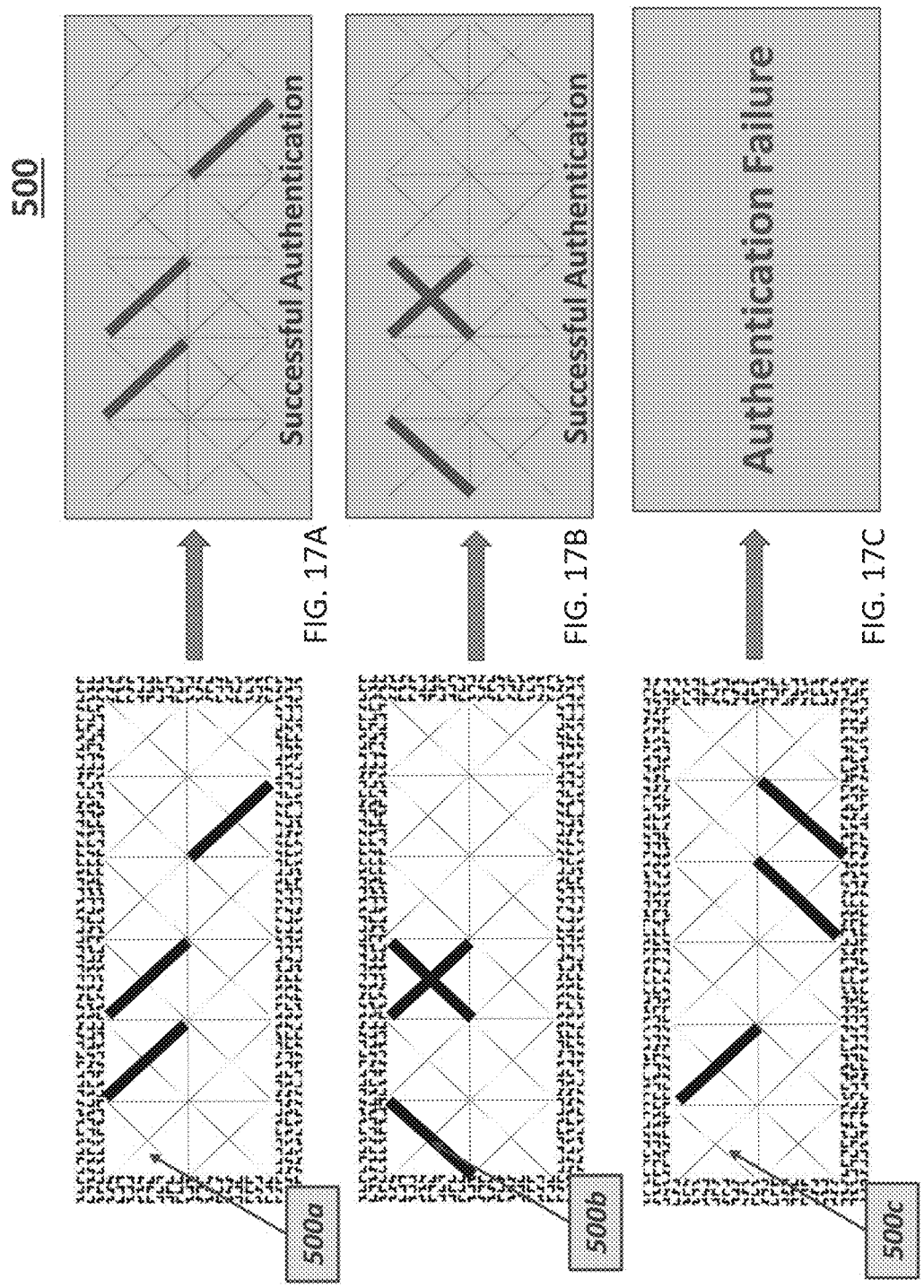

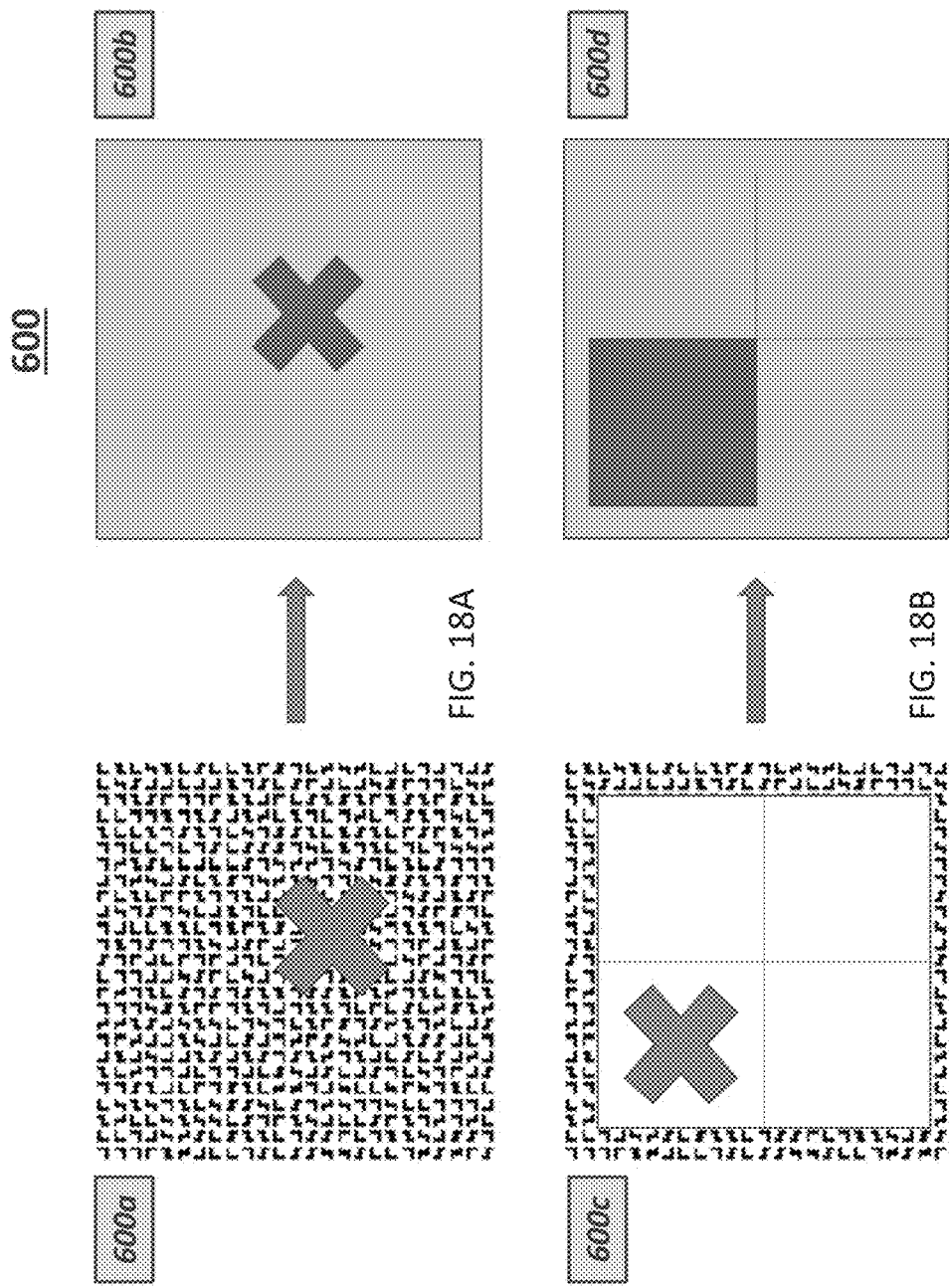

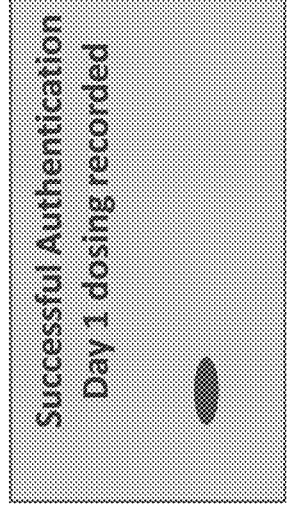
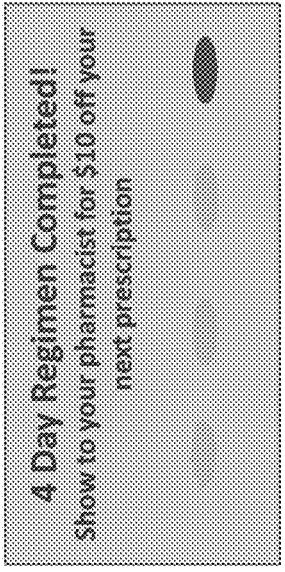
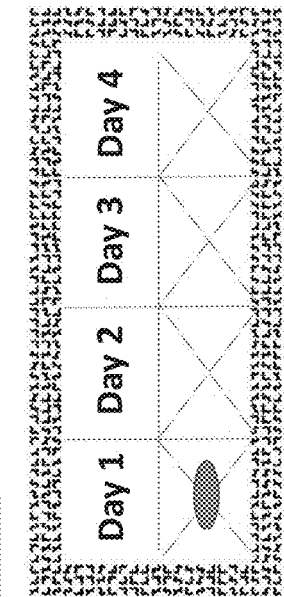
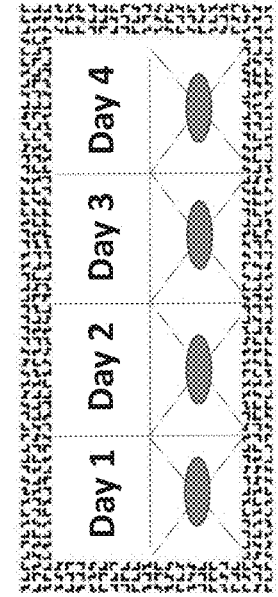
FIG. 19A
FIG. 19B

COPY DETECTION USING EXTINSIC FEATURES

CROSS-REFERENCE TO RELATED APPLICATIONS

This application claims priority to U.S. Provisional Patent Application No. 62/108,564 filed on Jan. 28, 2015, the entire contents of which are incorporated by reference herein.

BACKGROUND

Field of the Invention

The present invention relates to copy detection, and more specifically, to identifying copies of items using an arrangement of symbols printed on the items.

Description of Related Art

Humans interact with the information stored in secure digital archives by viewing printed and digital documents or screen images. This necessary conversion to an analog rendering weakens document security solutions and opens up opportunities for fraudulent changes. This is the Analog Hole in digital information management security.

Conventional detection of fraudulent or duplicate documents typically involves examining an intrinsic aspect of the document, such as paper texture or printing quality, to determine whether a document is original or genuine. For example, some systems examine differences in edge roughness of a documents contents to distinguish laser printed pages from inkjet printed pages, which have a higher degree of edge roughness. Intrinsic security features are intrinsic because they comprise characteristic visual features intrinsic to the processes used for producing the security documents.

A need exists for methods and systems for detecting fraudulent or duplicate documents that is secure, efficient, and highly reliable.

BRIEF SUMMARY

According to one embodiment of the present invention, a method for copy detection of items is disclosed. The method includes generating extrinsic features forming an arrangement of symbols. The symbols may include a variety of letters, groups of letters, characters, or pictures that are used instead of a word or a group of words. The symbols can be stored on a printer as a font, for example, as a TrueType font. The arrangement of symbols can be delivered by using a number string corresponding to symbols. The number string also can have formatting characters, such as spaces and returns. The arrangement of symbols are printed on an item which may hereinafter be referred to as the original or authentic item. For example, the arrangement of symbols can be printed on product packaging using a laser printer or other means. A representation of the arrangement of symbols is captured after being printed on the original item. Capturing the arrangement of symbols can include capturing a digital image. A registration signature is generated based on the captured arrangement of symbols. The registration signature can include a mathematical representation of the arrangement of symbols including the size and spacing of the symbols. The registration signature is then stored in a database, such as a secure, central electronic database. An authentication comparator may then receive a second representation based on a second arrangement of symbols and generate a second registration. The second representation may include a digital image of an arrangement of symbols printed on product packaging of unknown authenticity. The second signature is then compared with the registration signature in order to determine whether the second arrangement of symbols, and thus the item they are printed on, is authentic based on the comparison.

A system for performing copy detection using extrinsic features is provided, which includes an authentication symbol generator, an authentication engine, an authentication comparator, and a registration signature database. The authentication symbol generator is configured to generate an arrangement of symbols. The configuration can include where symbols can be stored on a printer as a font, and the arrangement of symbols is delivered as a number string corresponding to symbols. As part of said configuration, the number string also can have formatting characters, such as spaces and returns. The system may be associated with a printing device configured to print the arrangement of symbols on an 'original' item. The system may also be associated with a capture device configured to capture a representation of the arrangement of symbols after being printed on the original item. As described herein, the authentication symbol generator, the printing device, and the capture device may be part of an initial process for creating and affixing extrinsic information onto item that may later be used for authentication or copy detection by comparing unauthenticated items against the original information.

The authentication engine may be configured to generate a registration signature based on the captured arrangement of symbols and stored in a database. As discussed above, the database can be configured to store the registration signature and can be located centrally or distributed. An authentication comparator may be configured to receive a second representation of a second registration signature based on a second arrangement of symbols. The authentication comparator may then compare the second registration signature with the original registration signature stored in the database and determine whether the second arrangement of symbols is authentic based on the comparison. The second registration signature discussed above may be used as a new original registration signature. An authentication comparator may be configured to receive a third representation of such a new original registration signature. The authentication comparator may then compare the third registration signature with the new original registration signature stored in the database and determine whether the third arrangement of symbols is authentic based on the comparison. For example, the new original registration signature and comparisons thereto described above may be useful after a signature is affixed to a document the contents of which may have been authenticated according to the methods described above. In another example, the new original registration signature and comparisons thereto described above may be useful after completion of a form is completed.

In cases represented by a user affixing a signature to a document or completing a form, the system may be configured to provide feedback to the user in an interactive authentication. The interactive authentication can provide the user with a response known only to the user, which response can be created by the user only at the time immediately preceding the authentication event. Feedback on such an interactive authentication makes "spoofing" the authentication system much more difficult. "Spoofing" otherwise generally gives the user the impression of a valid authentication by simulating the look and feel of the valid system, only. "Spoofing" systems will consistently give a "successful authentication" response, although no actual authentication need to have occurred.

BRIEF DESCRIPTION OF THE SEVERAL VIEWS OF THE DRAWINGS

FIGS. 17A, 17B, and 17C show an alternative example (500) wherein a user provides a mark known only at the time immediately preceding the authentication event.

FIGS. 18A and 18B illustrate two other exemplary configurations for user interactive authentication.

FIGS. 19A and 19B show exemplary alternative modes of user-interactive feedback in the course of authentication or copy detection, and for second registration of signatures and other user-made marks.

DETAILED DESCRIPTION

The subject matter described herein includes methods and systems for copy detection using extrinsic features based on a unique arrangement of symbols printed on items. Extrinsic features are features added to allow authentication of the document. These extrinsic features can also be used to detect fraudulent or duplicate documents. The symbols can be used to authenticate items by comparing a signature of an item being authenticated with a registration signature obtained when the symbols were printed on the original item. In contrast to conventional configurations which analyze intrinsic aspects of documents and other items, the present disclosure leverages several advantages of the extrinsic arrangement of symbols printed on genuine items in order to provide a more secure, efficient, and reliable method for detecting fraudulent or duplicate copies.

Figure 1:
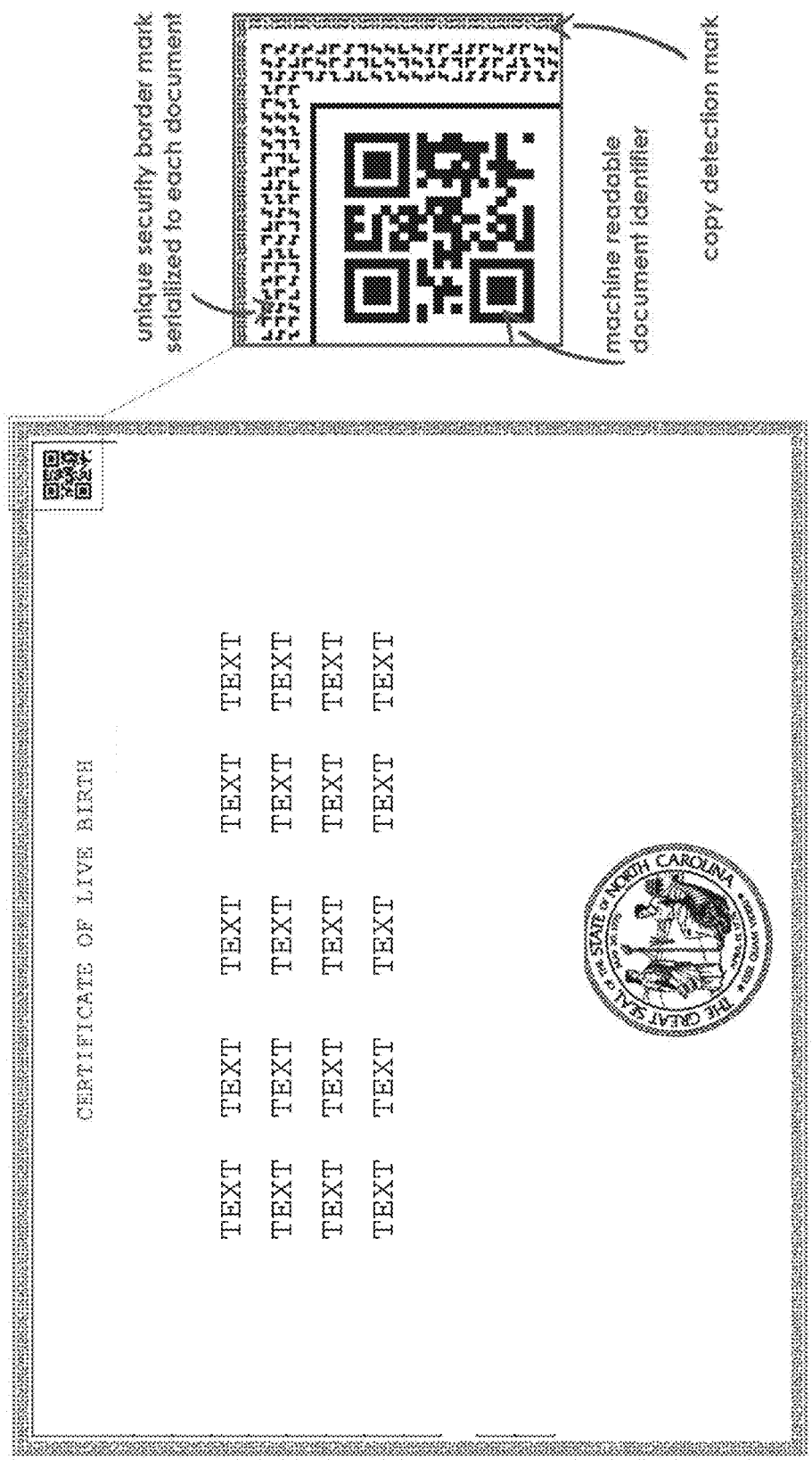
FIG. 1 is an example of a document including an arrangement of symbols printed thereon for copy detection and validation according to an embodiment of the subject matter described herein.

In one embodiment, the method begins by generating an arrangement of symbols. The symbols may include a variety of letters, groups of letters, characters, or pictures that are used instead of a word or a group of words. FIG. 1 illustrates a birth certificate document incorporating an arrangement of symbols provided as a unique security border to the document. The symbols may have one or more layers and one or more borders or other patterns. As shown in FIG. 1, an inner border includes three layers of symbols and an outer border that includes two layers of symbols. The inner border may be used to uniquely identify the document while the outer border may be used for copy detection. The shapes of the symbols may be selected for various reasons including legibility and the content of the information being encoded. The symbols shown in FIG. 1 may include component shapes for forming Hindu-Arabic numerals and English letters.

The symbols can be stored on a printer as a font, and in some cases the font is a custom font. Custom fonts can be "TrueType" fonts, which allows unlimited, accurate scaling of symbols in the font. FIG. 100a illustrates an example of a symbol set that can be configured as a TrueType font, and also illustrates that the font can have formatting characters, like "space" and "return". The arrangement of symbols can be delivered by using a number string corresponding to symbols, and that the number string also can specify the formatting characters (as seen in FIG. 100b). The number string provides instructions to a printer that has been loaded with a custom font of the type shown in FIG. 100a, the result of which is that the arrangement of symbols has the configuration shown in FIG. 100d, which is just one of a virtually limitless number of configurations that can be specified using the system described above.

The arrangement of symbols is printed on an item which may hereinafter be referred to as the original or authentic item. For example, the arrangement of symbols can be printed on product packaging using a laser printer or other means. As shown in FIG. 1, the birth certificate printed at the time of birth may be referred to as an original or authentic document. It may be appreciated that there can be multiple authentic documents. This can include multiple copies of the same information printed by the same authority at the same time. For example, family members may require multiple copies of an authentic death certificate for various purposes. Each death certificate may be uniquely identifiable using a different arrangement of symbols printed on each authentic copy. Thereafter, duplicates of any of the "original" set of death certificates may be detected also using the arrangement of symbols printed thereon and the techniques described herein.

A representation of the arrangement of symbols is captured after being printed on the original item. Capturing the arrangement of symbols can include capturing a digital image. For example, a camera may be associated with, positioned near, or integrated with the printing device that printed the document and the arrangement of symbols thereon. The digital image representation of what was printed on the document at a time when it is certain that the document is authentic and unaltered can be stored securely and separately from other representations of the document in order that the representation may be used to later authenticate documents.

A registration signature is generated based on the captured arrangement of symbols. The registration signature can include a mathematical representation of the arrangement of symbols including the size and spacing of the symbols.

The registration signature is then stored in a database, such as a secure, central electronic database. In other embodiments, the registration signature may be stored in multiple databases. For example, the registration signature may be stored remotely on-site, in an offline database, or on a mobile device. Medical or military missions to remote areas without Internet access to a central database may require such duplication or division of the registration signature database.

An authentication comparator may then receive a second representation based on a second arrangement of symbols and generate a second registration signature. The second representation may include a digital image of an arrangement of symbols printed on product packaging of unknown authenticity. For example, a birth certificate of unknown authenticity, provenance, origin, or chain of custody claiming to be the same original and authentic birth certificate shown in FIG. 1 may be presented for authentication. In one possible embodiment, a user may capture a digital image of the suspect birth certificate and send the image to a remotely located authentication comparator for authentication via an application executed on the mobile phone. The authentication comparator, whether separately or in combination with the mobile application, may generate a statistical characterization of the image (i.e., second registration signature).

The second signature is then compared with the registration signature in order to determine whether the second arrangement of symbols, and thus the item they are printed on, is authentic based on the comparison.

According to one embodiment, comparing the second registration signature with the original registration signature and determining whether the second arrangement of symbols is authentic based on the comparison may include calculating various values and performing statistical analysis of those values. For example, for a given document (aka image), a measure of the shapiness, blurriness, skew, brightness, etc. may be calculated. Shapiness may refer to the similarity of one shape to another.

It may be also appreciated that each document may be associated with and/or defined by a corresponding digital image of the document. The digital image may include either a digital image that is a captured image of a printed document and/or a digital original image that has never been printed. Various combinations of scanning and printing were performed at various dots per square inch (DPI) levels. For example, a high-resolution image may be printed at low resolution or, conversely, a low-resolution image may be printed at high resolution. In addition, high-resolution scans were captured of high-resolution prints. Various types of image capture and printing devices were used. Finally, various image capture settings were used to help determine how significant factors—in addition to resolution and shapiness (such as blur, skew, and brightness)—are to performing successful copy detection using the methods described herein. As a result, example data was gathered for permutations of printing and scanning images at 300, 600, and 1200 DPI. Data was also gathered for permutations of up to a maximum of two printings and two scans to determine a level degradation in image quality from one generation of print/scan to another generation of print/scan. Such information may allow system operators to optimize the system to scrutinize certain variables that may be more important than other variables for identifying copies. This may allow for faster detection and less processing, which may result in a cheaper, lower power, more versatile and desirable system (e.g., field uses where copy detection is performed at least in part on a mobile phone). It is appreciated that the data gathered and described herein is for illustration purposes and not intended to be limiting. Similar methods and/or conclusions may be applied to any combination of image characteristics, including higher resolution scans or prints and more than two scans or prints, without departing from the scope of the subject matter described herein. For simplicity of illustration, however, the present disclosure may focus on a subset of image characteristics.

Figure 2:
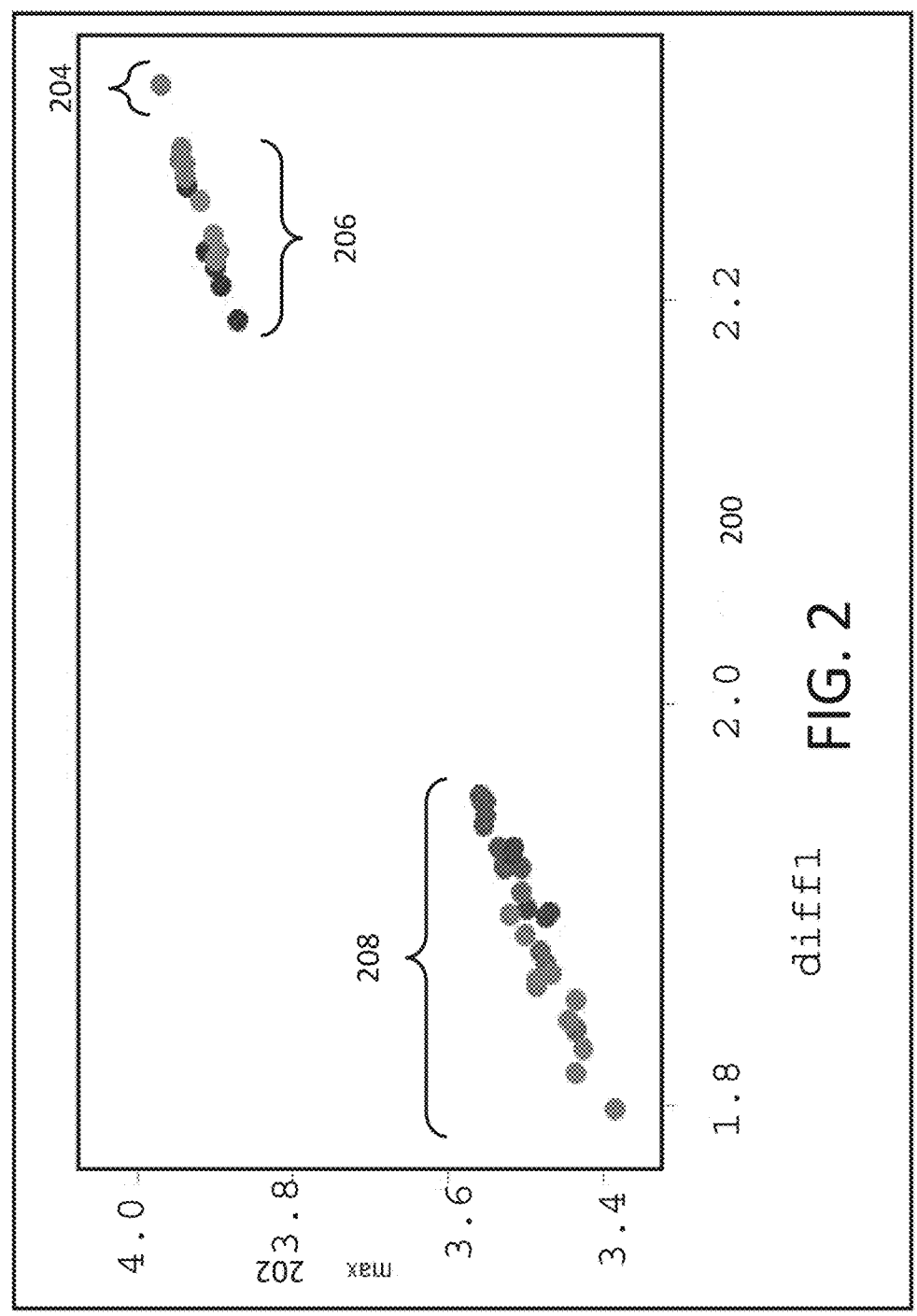
FIG. 2 is a scatterplot illustrating an example data set showing clustering of images captured with various characteristics for distinguishing between images of authentic documents and images of copies of documents according to an embodiment of the subject matter described herein.

With reference now to FIG. 2, a scatterplot of example data showing threshold and clustering of image data at various levels of scanning and printing are shown. FIG. 2 shows a diff1 value 200 on the x-axis and a maximum value 202 on the y-axis. The range of each of values 200 and 202 is illustrative and not intended to represent or limit the maximum or actual ranges for a given image. As mentioned herein, a statistical measure may be calculated for a document image. In FIG. 2, the calculated statistical measure includes diff1 200. Diff1 200 may include the difference between a first maximum and a second maximum value for the image. Here, a shapiness value may be measured. As a result, a small value for diff1 200 may indicate that the shape is not distinct from other shapes. In other words, if diff1 is small then the shape being examined is similar to other shapes. Conversely, a high value for diff1 200 may indicate that the shape is very distinct from other shapes.

Similar metrics may include diff2 (not shown). Diff2 may include a difference between a maximum value and an average value for an image. Also similar to diff1, a small value for diff2 may indicate that the shape being examined is similar to other shapes (not distinct). Other metrics may be used to calculate differences or similarities in shapes. Measured metrics may include a minimum, a mean, a mode, a standard deviation, or other statistical measurements that can be recorded from a given article to examine. From these measured metrics, calculated metrics may be used. Diff2 is an example of one such calculated metric, but the calculated metrics may be formed from any mathematical combination of zero or more measured metrics and zero or more calculated metrics. This can be a simple sum of two metrics, a difference between metrics, or a dot or cross product of a set of metrics. The metrics calculated or used may then be classified by the software to mark a shape location as distinct or non distinct. The levels of distinction that are measured by these metrics can be further classified into a level of confidence that the current shape is either distinct, distinct but a copy, or not distinct. The classification for this will be made by the software program following standard art classification methods such as thresholding, Bayesian classification, or SVM [support vector machine] classification.

Returning now to FIG. 2, a digital original image (e.g., never printed and scanned) 204 may have the highest combination of diff1 200 and max 202, as indicated by being located in the upper right portion of FIG. 2. Data points 206 may represent various first printings and first scans of original image 204. Both images 204 and 206 may be authentic and original (not copies). For example, an arrangement of symbols may be printed on pharmaceutical packaging at the time of manufacturing (first printing). A digital image may also be captured of the first printing at the time of manufacturing (first scan). Subsequent scans may be compared with the image obtained at the first scan. Any image captured of the original packaging (first printing) may be authenticated. Conversely, any image captured of a copy of the packaging may be detected as a copy. In some embodiments, data obtained from the image of the unauthentic packaging may provide a forensic signature used to indicate a source of the copying and/or a number of generations (e.g., one generation includes one printing and one scanning) between the original document and the copied document. Data points 206 may be clustered around a range of values for diff1 200 and max 202. Data points 206 may also be distinct and distinguishable from original digital image 204 because all of data points 206 include at least one printing and scanning of the printing, whereas image 204 has never been printed.

Data points 208 may represent various copies of the document obtained by (again) printing and scanning the document at various resolutions or other characteristics. Data points 208 may represent a first generation of inauthentic copies of document 206. The upper-right of range 208 may include the highest resolution combination of prints and scans of the document (e.g., high quality copy/forgery), whereas the lower-left of range 208 may include the lowest resolution combination of prints and scans of the document (e.g., poor quality copy/forgery). It may be appreciated that data points 206 and 208 are separated by a range of values for diff1 200 and max 202. The gap represents the detectable difference between images of the original document (i.e., authentic) and images of copies of the original document (i.e., not authentic). By analyzing diff1 200 for a given image of a document it may be determined whether the image is authentic or a copy based on whether the data point obtained is located within cluster 206 (i.e., authentic) or within cluster 208 (i.e., copy). While higher resolution scanning and/or printing technology may be used, clusters 208 and 206 would still not overlap and are thus distinguishable using current technology.

Figure 3:
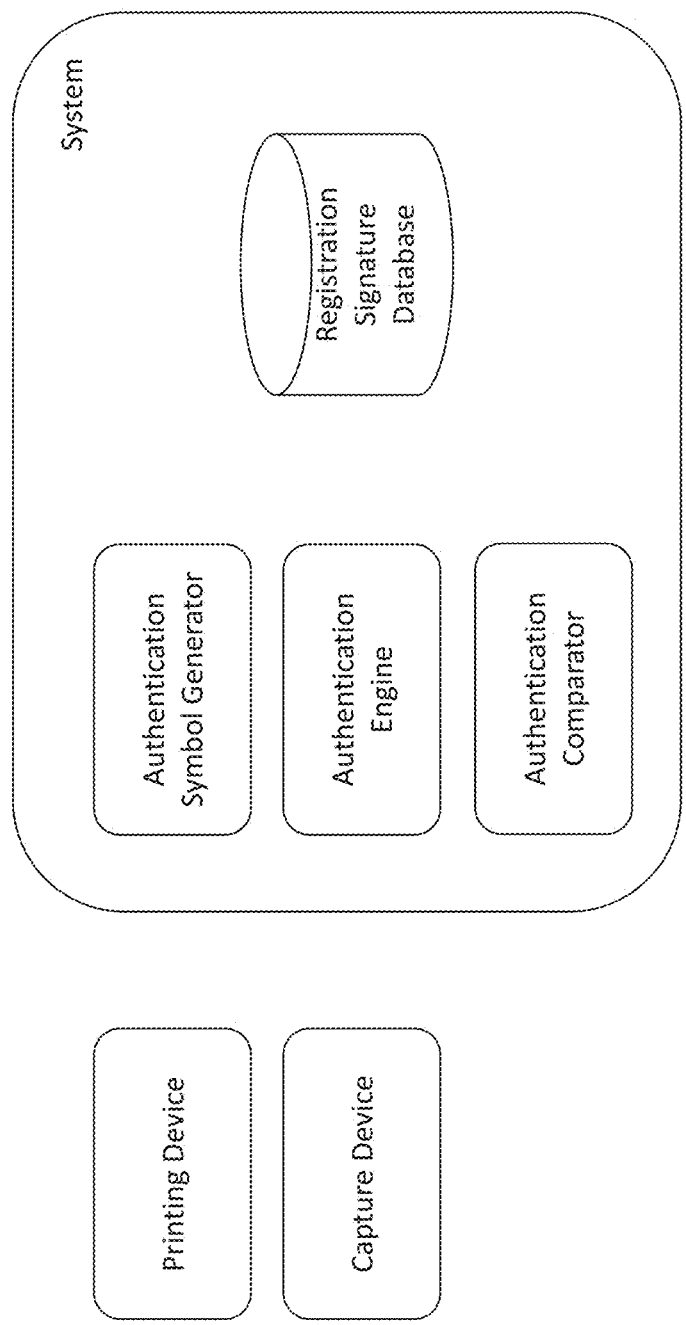
FIG. 3 is a system diagram illustrating an example system suitable for performing copy detection according to an embodiment of the subject matter described herein.

With reference now to FIG. 3, a system suitable for performing copy detection is provided. The system can include an authentication symbol generator configured to generate an arrangement of symbols. The system may be associated with a printing device configured to print the arrangement of symbols on an original item.

The system may also be associated with a capture device configured to capture a representation of the arrangement of symbols after being printed on the original item. As described herein, the authentication symbol generator, printing device, and capture device may be used as part of an initial process for creating and affixing extrinsic information that may later be used for authentication or copy detection by comparing later-determined information against the original information.

The capture device may be any appropriately configured imaging device such as, for example, an industrial grade camera, a camera from a mobile device, or the like. The authentication symbol generator may be in communication with the printing device in order to print the generated authentication symbol onto an article. The article may be any article that is capable of being printed on, such as, for example, documents, packaging, and the like. The registration signature database may be server or cloud based, while in some embodiments could be embodied on hardware shared with the capture device.

An authentication engine may be configured to generate a registration signature based on the captured arrangement of symbols and stored in a database. As discussed above, the database can be configured to store the registration signature centrally or distributed. An authentication comparator may be configured to receive a second representation of a second registration signature based on a second arrangement of symbols. The authentication comparator may then compare the second registration signature with the original registration signature stored in the database and determine whether the second arrangement of symbols is authentic based on the comparison.

An image-processing device may be configured to perform pre-processing, post-processing, or both on the second representation of the second signature. The image-processing device may thus be configured to detect at least one of blurriness, edges, color, resolution, rotation, skew, and brightness. The image-processing device may be configured to reject the second representation if the second representation fails to satisfy one or more predetermined image quality thresholds or conditions.

According to one or more embodiments, a system is thus provided and includes an authentication symbol generator configured to generate an arrangement of symbols, a printing device configured to print the arrangement of symbols on an original item, a first capture device configured to capture a representation of the arrangement of symbols after being printed on the original item, and an authentication engine configured to generate a registration signature based on the captured arrangement of symbols. A database is configured to store the registration signature and an authentication comparator is configured to receive a second representation of a second registration signature based on a second arrangement of symbols, compare the second registration signature with the original registration signature stored in the database, and determine whether the second arrangement of symbols is authentic based on the comparison.

FIGS. 4 through 14 illustrate various testing performed in order to validate that typical combinations of scanning and printing are detectable as copies using the methods described herein. The first test shown in FIGS. 4 through 7 may include a test on scanned images with different resolutions. A 600 dpi original digital image (png file) may be printed at 300 dpi. The 300 dpi print may then be scanned at 300 dpi, 600 dpi, and 1200 dpi. The 300 dpi print may be scanned five times at each resolution.

TABLE I is a table showing various statistical measures calculated for each of the images.

TABLE I

| group | Variable | N | Mean | Std Dev | Minimum | Maximum |
|---|---|---|---|---|---|---|
| image1_1200 | max | 5 | 3.961403 | 0.018379 | 3.949612 | 3.993968 |
| | diff1 | 5 | 2.279319 | 0.00826 | 2.27367 | 2.293621 |
| | diff2 | 5 | 3.050455 | 0.014523 | 3.041392 | 3.076218 |
| | std | 5 | 1.153928 | 0.006173 | 1.150203 | 1.164886 |

TABLE I-continued

| group | Variable | N | Mean | Std Dev | Minimum | Maximum |
|---|---|---|---|---|---|---|
| image1_300 | max | 5 | 3.971737 | 0.006419 | 3.963039 | 3.978771 |
|  | diff1 | 5 | 2.286632 | 0.009451 | 2.273407 | 2.295413 |
|  | diff2 | 5 | 3.054824 | 0.005607 | 3.047327 | 3.06022 |
|  | std | 5 | 1.154581 | 0.001965 | 1.151368 | 1.156454 |
| image1_600 | max | 5 | 4.009624 | 0.011693 | 3.98908 | 4.016646 |
|  | diff1 | 5 | 2.319067 | 0.006934 | 2.31342 | 2.330104 |
|  | diff2 | 5 | 3.088463 | 0.009602 | 3.071788 | 3.095024 |
|  | std | 5 | 1.166783 | 0.004072 | 1.159652 | 1.169918 |
| image2_1200 | max | 5 | 3.925826 | 0.008392 | 3.914568 | 3.93699 |
|  | diff1 | 5 | 2.234535 | 0.007847 | 2.221616 | 2.242754 |
|  | diff2 | 5 | 3.027105 | 0.006334 | 3.018233 | 3.034973 |
|  | std | 5 | 1.149329 | 0.00234 | 1.146869 | 1.152771 |
| image2_600 | max | 5 | 3.925766 | 0.003242 | 3.921872 | 3.929164 |
|  | diff1 | 5 | 2.246351 | 0.008534 | 2.238186 | 2.258023 |
|  | diff2 | 5 | 3.026416 | 0.003003 | 3.02271 | 3.02963 |
|  | std | 5 | 1.14656 | 0.000479 | 1.14591 | 1.14704 |

Figure 4:
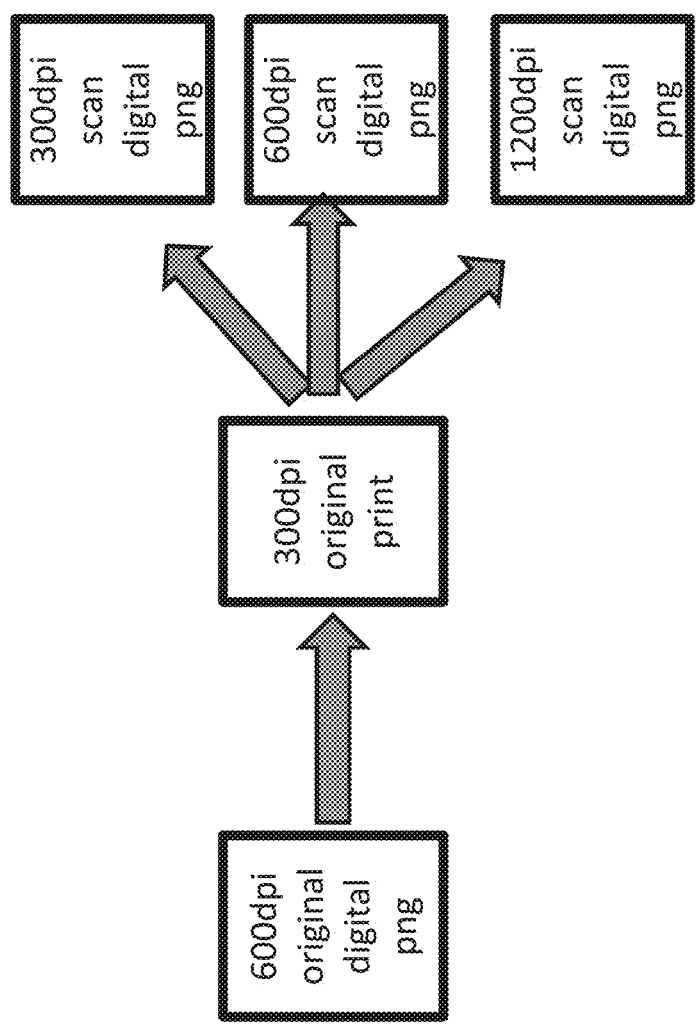
FIGS. 4 through 12 are various diagrams showing different tests performed to validate typical combinations of scanning and printing using the methods described herein.
Figure 5:
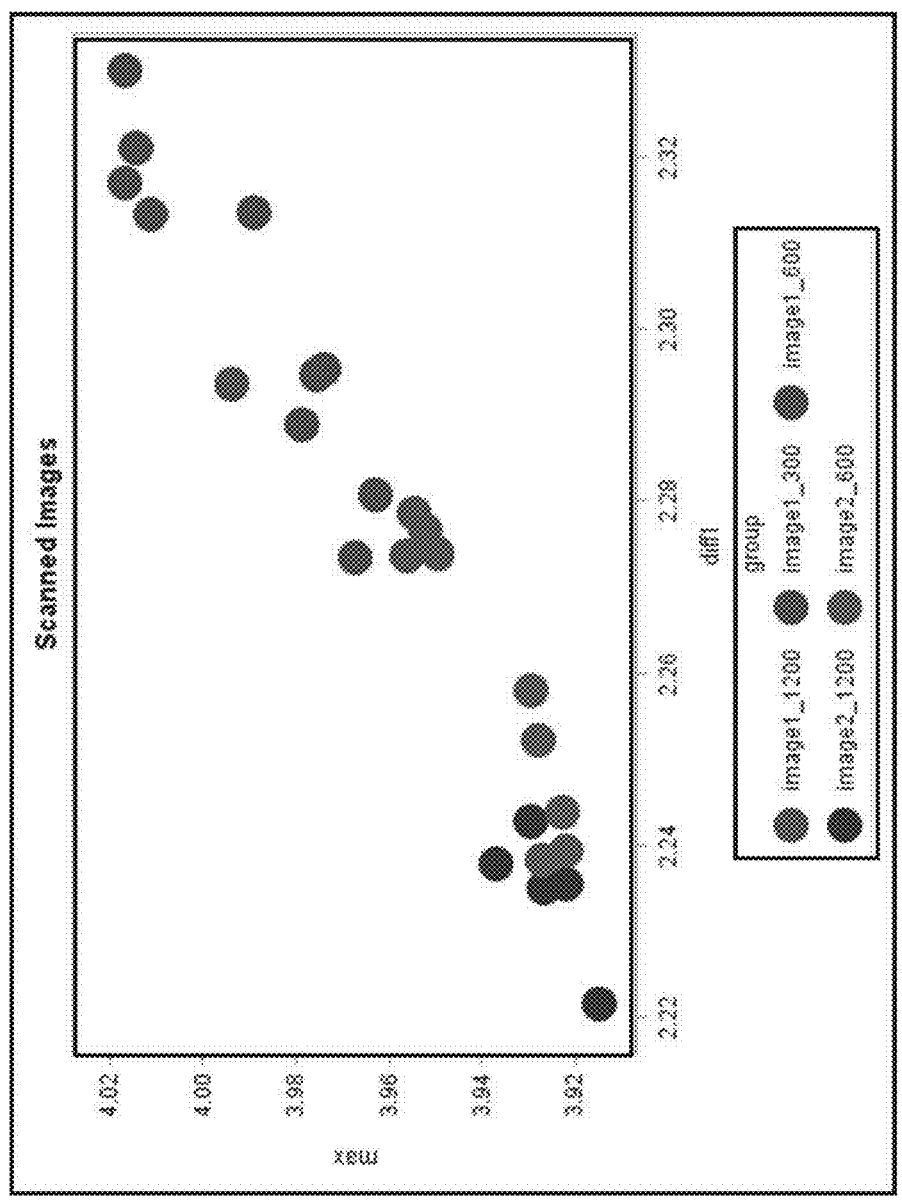
Figure 6:
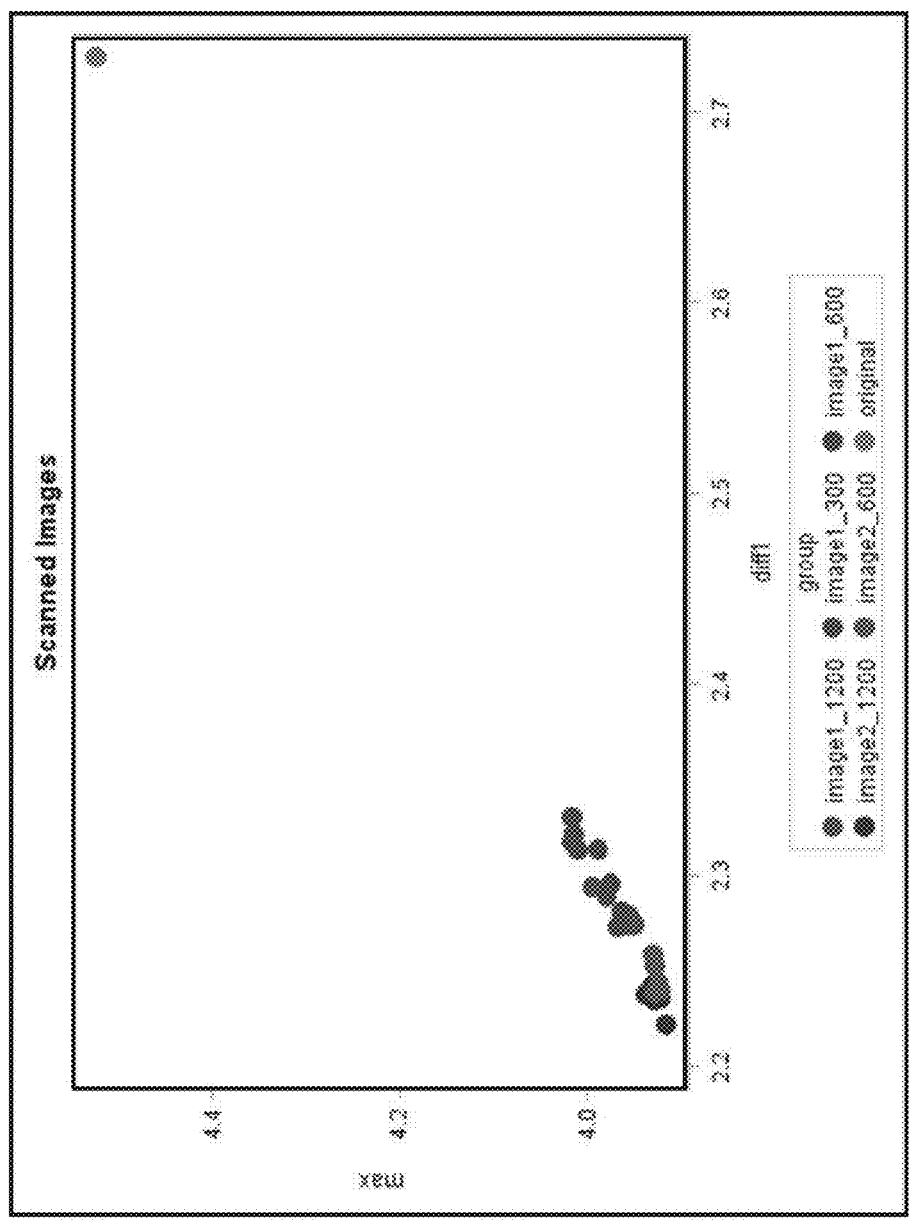

FIG. 5 shows a scatterplot of the results from FIG. 4 as a function of diff1.

Figure 7:
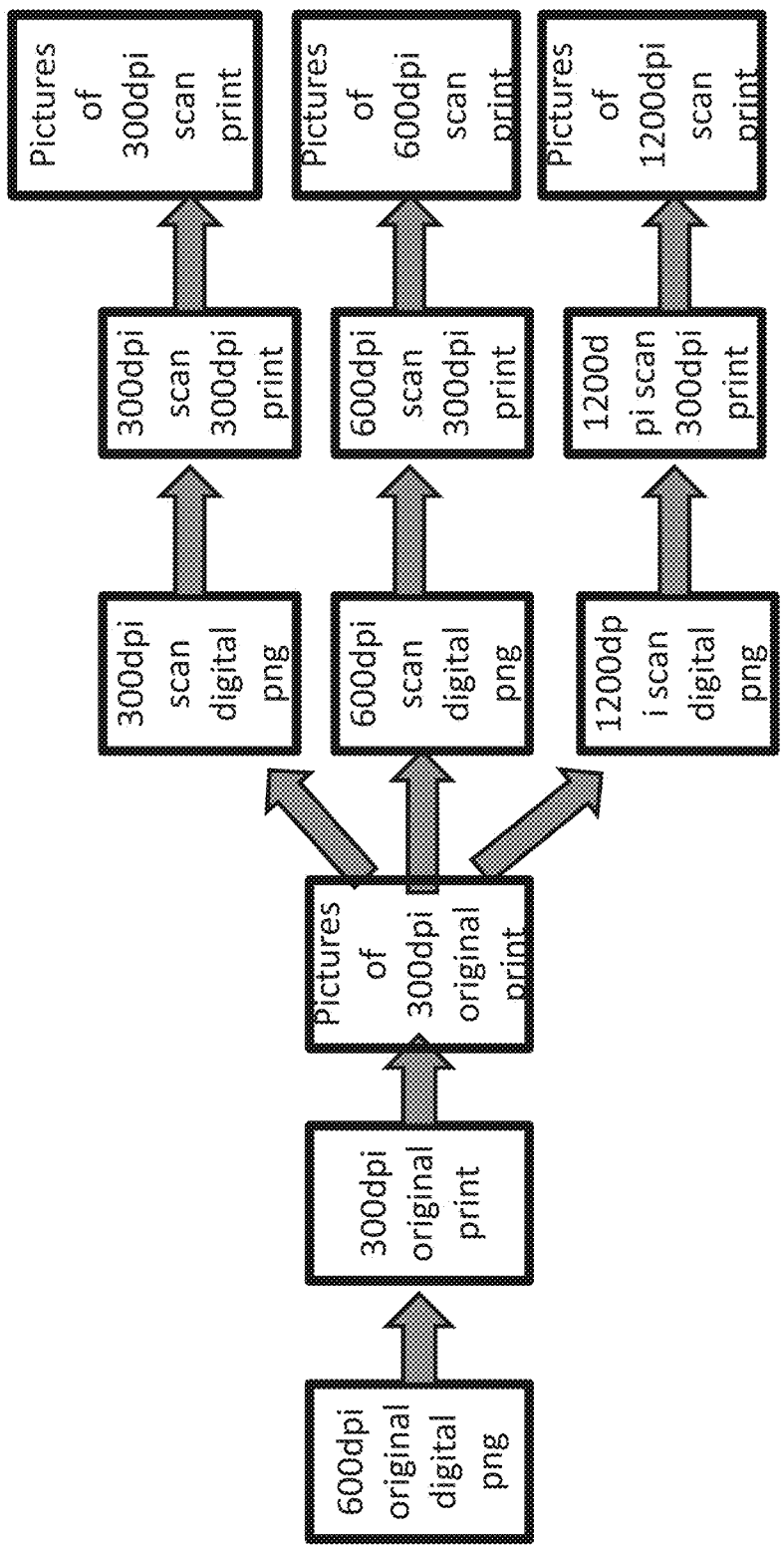
Figure 8:
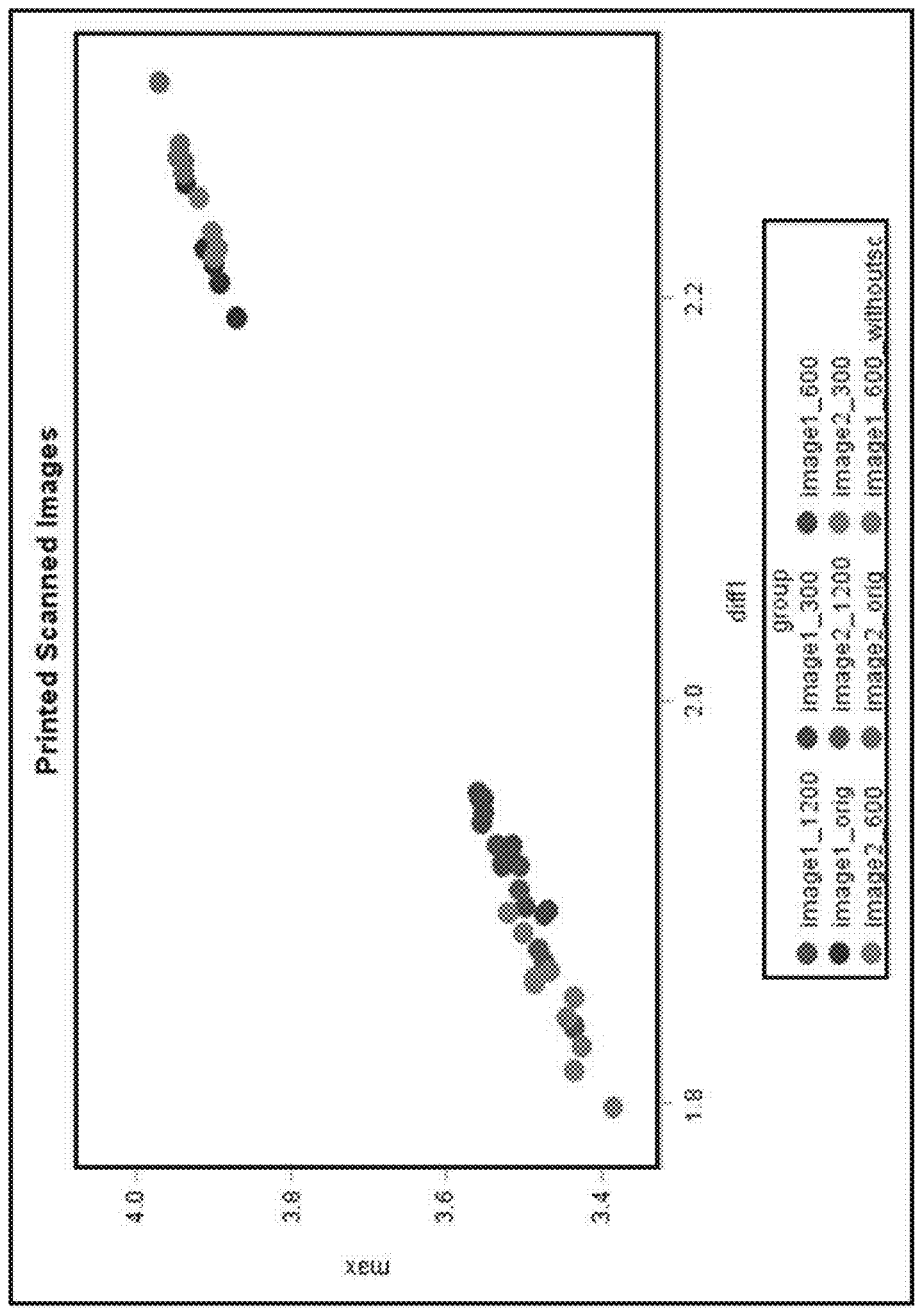

A second test shown in FIGS. 7 through 8 may include testing printed scanned images. A 600 dpi original image may be printed at 300 dpi. Then, pictures of the 300 dpi print may be captured at 300, 600, and 1200 dpi. Each of these digital images is then printed again at the same 300, 600, and 1200 dpi resolutions. Finally, images of each of the prints are captured at 300, 600, and 1200 dpi. The second test may be performed in order to determine whether scaling makes a difference to the detectability of copies. For example, images scanned at high resolution may be much larger than images scanned at low resolutions. Each image may then be scaled according to its respective resolution in order to normalize the sizes of the images in the data set.

TABLE II is a table showing data obtained from the second test and FIG. 8 is a scatterplot showing the same data. As can be seen from the Figures, scaling does not prevent detecting copies.

TABLE II

| group | Variable | N | Mean | Std Dev | Minimum | Maximum |
|---|---|---|---|---|---|---|
| image1_1200 | max | 5 | 3.528587 | 0.020859 | 3.504626 | 3.559573 |
|  | diff1 | 5 | 1.927945 | 0.01506 | 1.917741 | 1.954017 |
|  | diff2 | 5 | 2.701528 | 0.015717 | 2.685829 | 2.726136 |
|  | std | 5 | 1.048526 | 0.005137 | 1.042499 | 1.055747 |
| image1_300 | max | 5 | 3.547854 | 0.012172 | 3.526424 | 3.556008 |
|  | diff1 | 5 | 1.940978 | 0.013962 | 1.917693 | 1.951722 |
|  | diff2 | 5 | 2.71575 | 0.011014 | 2.696289 | 2.723034 |
|  | std | 5 | 1.054411 | 0.003048 | 1.049301 | 1.057309 |
| image1_600 | max | 5 | 3.494708 | 0.022452 | 3.469646 | 3.517092 |
|  | diff1 | 5 | 1.908068 | 0.017253 | 1.833575 | 1.928661 |
|  | diff2 | 5 | 2.673262 | 0.017529 | 2.654847 | 2.690904 |
|  | std | 5 | 1.037807 | 0.005766 | 1.031513 | 1.042811 |
| image1_orig | max | 5 | 3.902547 | 0.024342 | 3.870376 | 3.936609 |
|  | diff1 | 5 | 2.218671 | 0.024575 | 2.189805 | 2.256338 |
|  | diff2 | 5 | 3.000167 | 0.022552 | 2.971768 | 3.033501 |
|  | std | 5 | 1.137804 | 0.006315 | 1.129188 | 1.146443 |
| image2_1200 | max | 5 | 3.466123 | 0.030839 | 3.434387 | 3.505066 |
|  | diff1 | 5 | 1.865832 | 0.028747 | 1.837471 | 1.905754 |
|  | diff2 | 5 | 2.645382 | 0.025604 | 2.618812 | 2.677493 |
|  | std | 5 | 1.036124 | 0.00769 | 1.027535 | 1.045168 |
| image2_300 | max | 5 | 3.431369 | 0.030314 | 3.384448 | 3.46669 |
|  | diff1 | 5 | 1.837543 | 0.025677 | 1.798414 | 1.865277 |
|  | diff2 | 5 | 2.620403 | 0.026322 | 2.579469 | 2.650747 |
|  | std | 5 | 1.028144 | 0.007703 | 1.016045 | 1.036363 |
| image2_600 | max | 5 | 3.485483 | 0.031456 | 3.435067 | 3.520164 |
|  | diff1 | 5 | 1.863705 | 0.030325 | 1.816499 | 1.895306 |
|  | diff2 | 5 | 2.666632 | 0.026252 | 2.624554 | 2.695483 |
|  | std | 5 | 1.044734 | 0.007572 | 1.032613 | 1.053483 |
| image2_orig | max | 5 | 3.947196 | 0.013273 | 3.937555 | 3.970359 |
|  | diff1 | 5 | 2.276185 | 0.017625 | 2.261778 | 2.306471 |
|  | diff2 | 5 | 3.04259 | 0.01118 | 3.034482 | 3.061825 |
|  | std | 5 | 1.150962 | 0.002291 | 1.148842 | 1.154859 |

Figure 9:
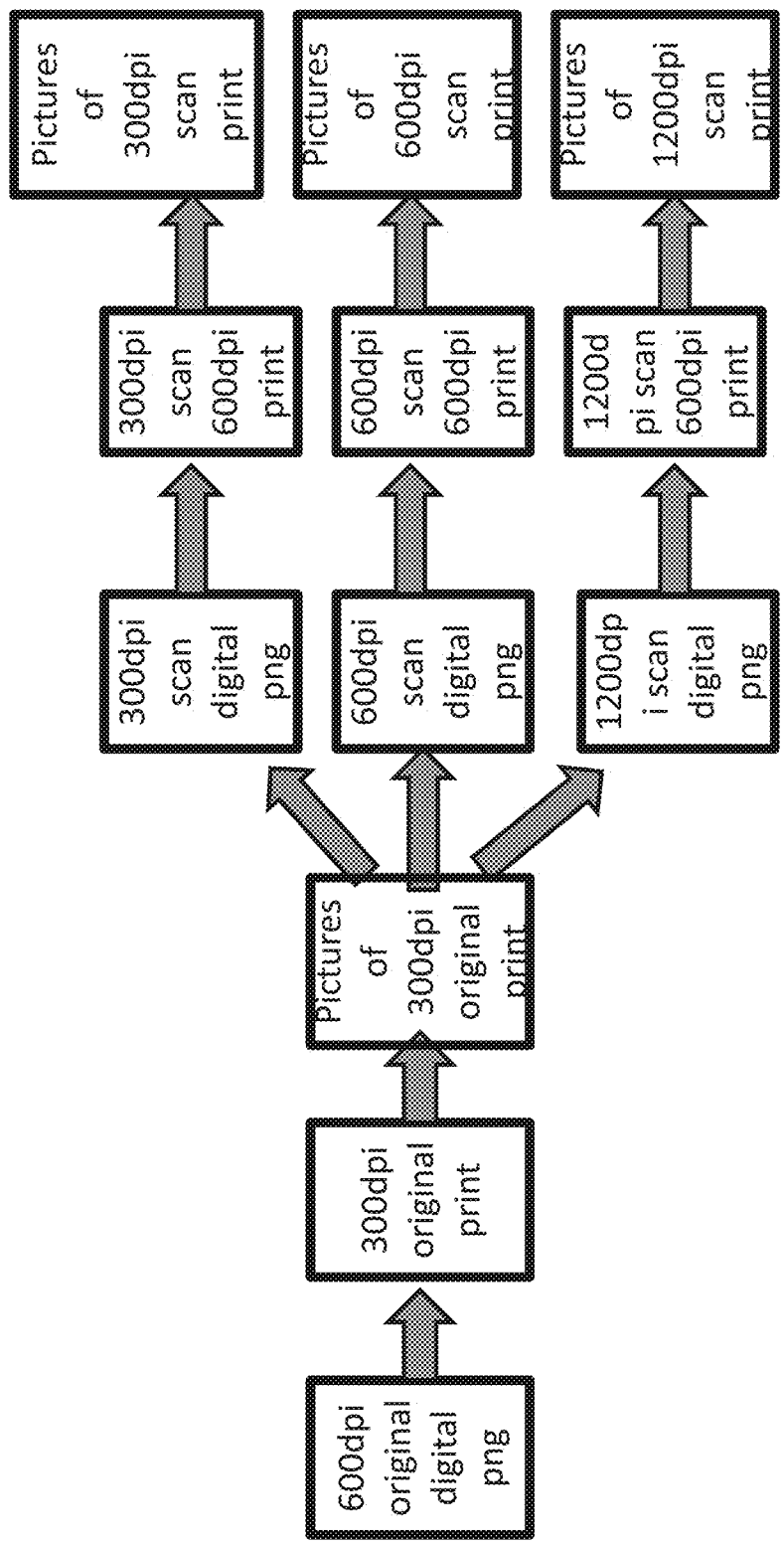
Figure 10:
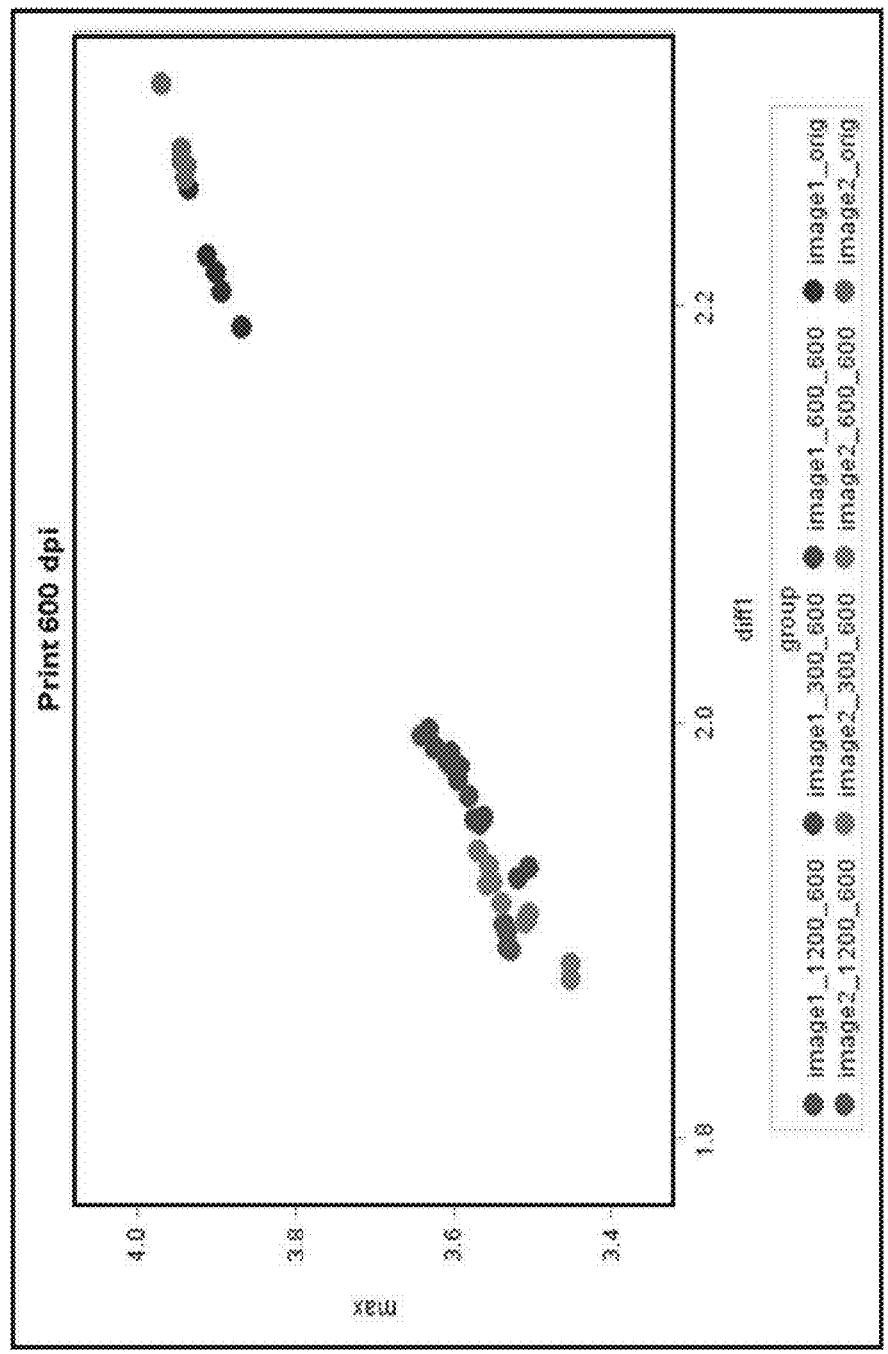

A third test shown in FIGS. 9 through 10 may be similar to the second test, except that 600 dpi is used to print the scanned images as shown in process flow chart FIG. 9.

Figure 11:
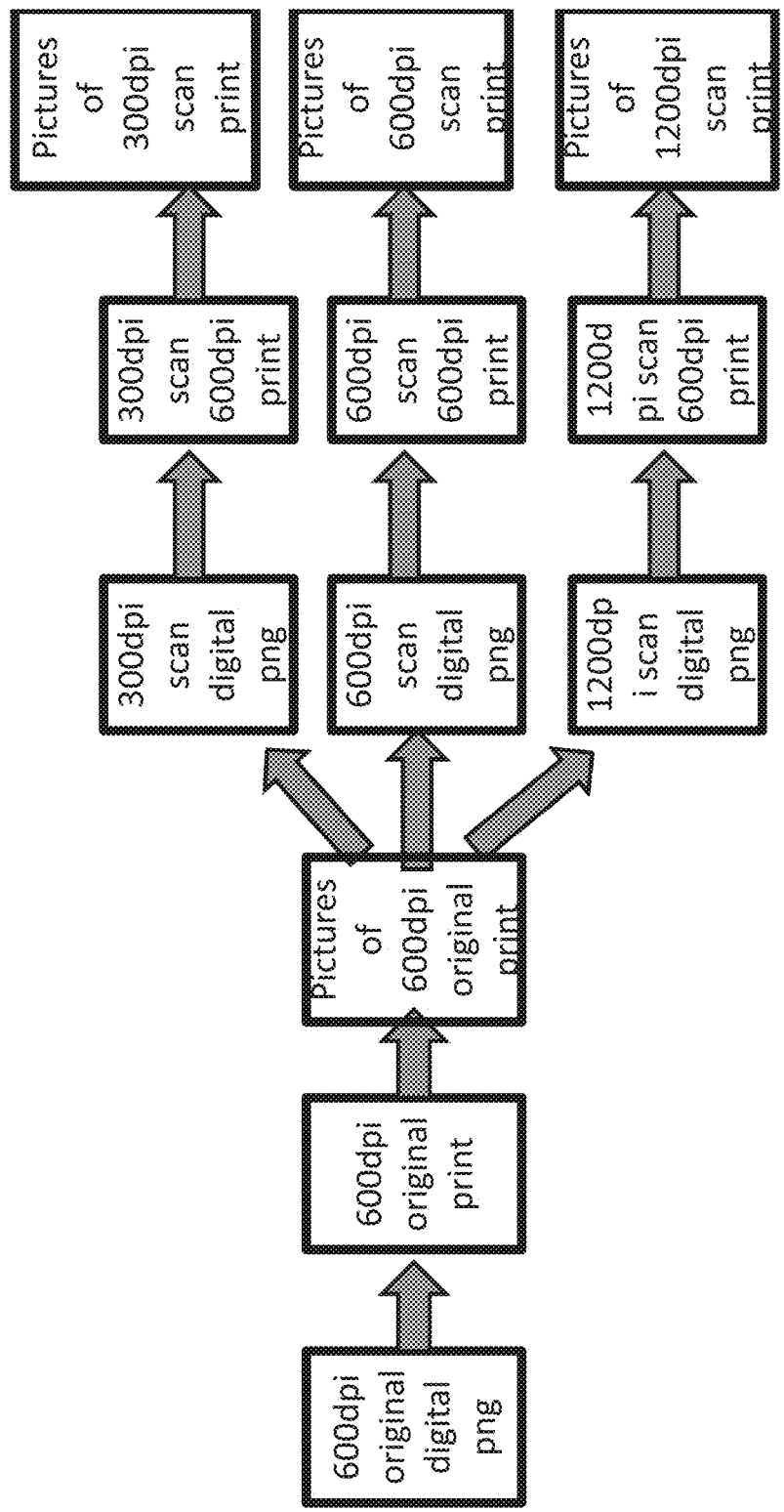
Figure 12:
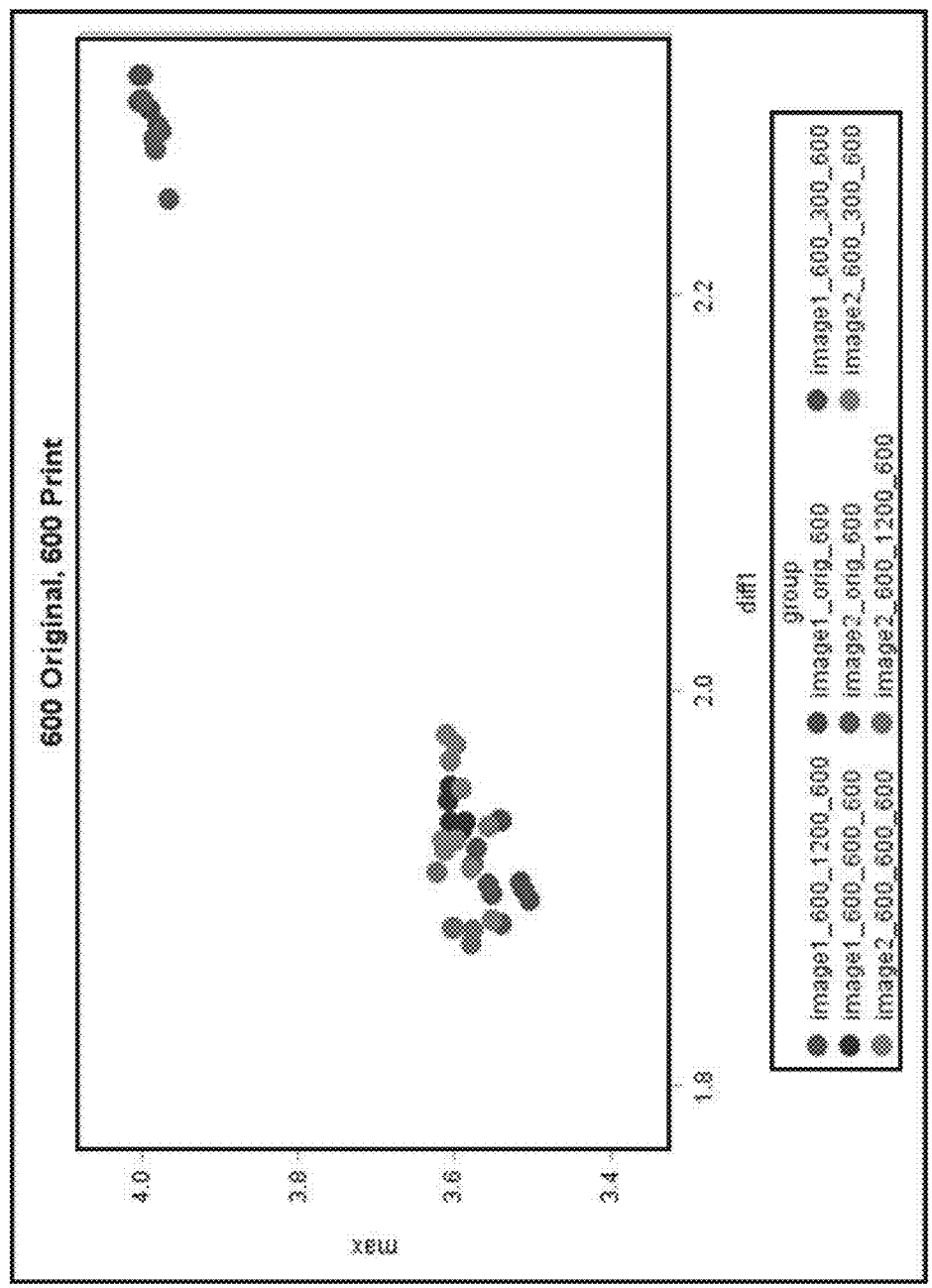
Figure 13:
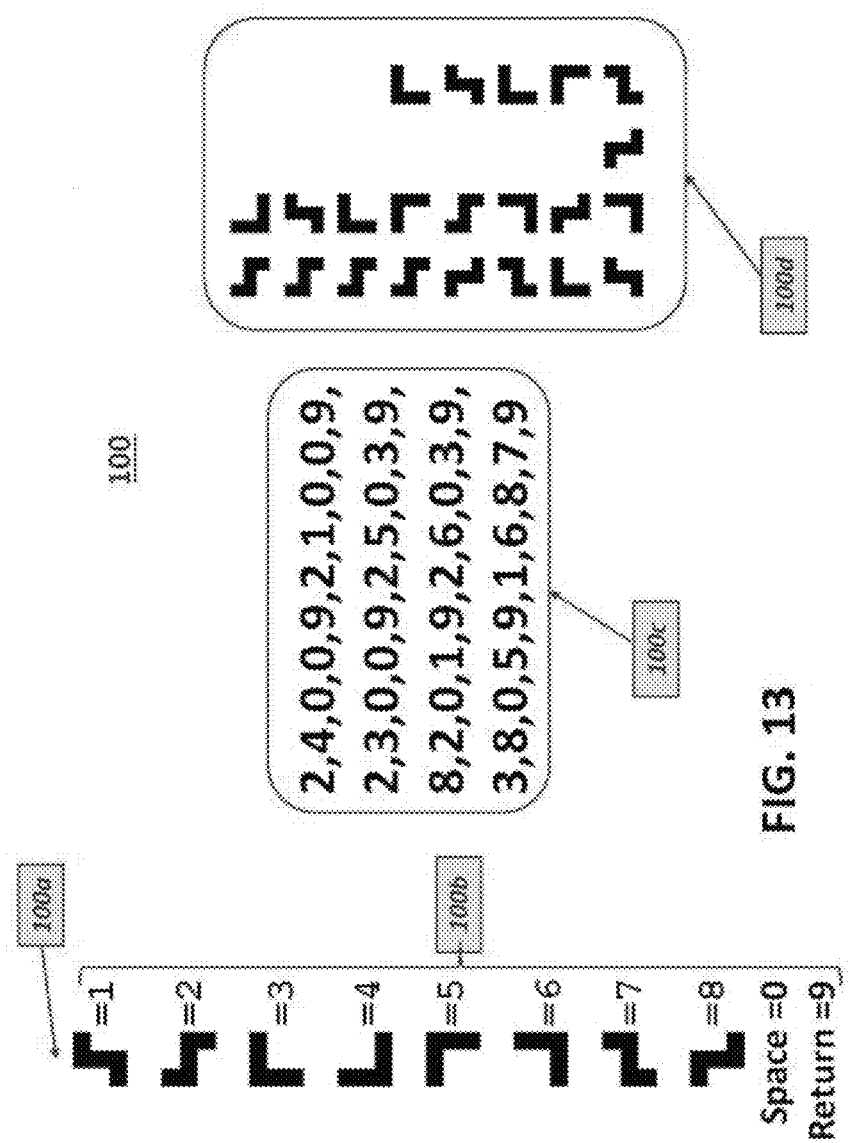
FIG. 13 illustrates a representative symbol-set font, the relationship of the font to a number string, and how a number string can be used to create an arrangement of symbols.
Figure 14:
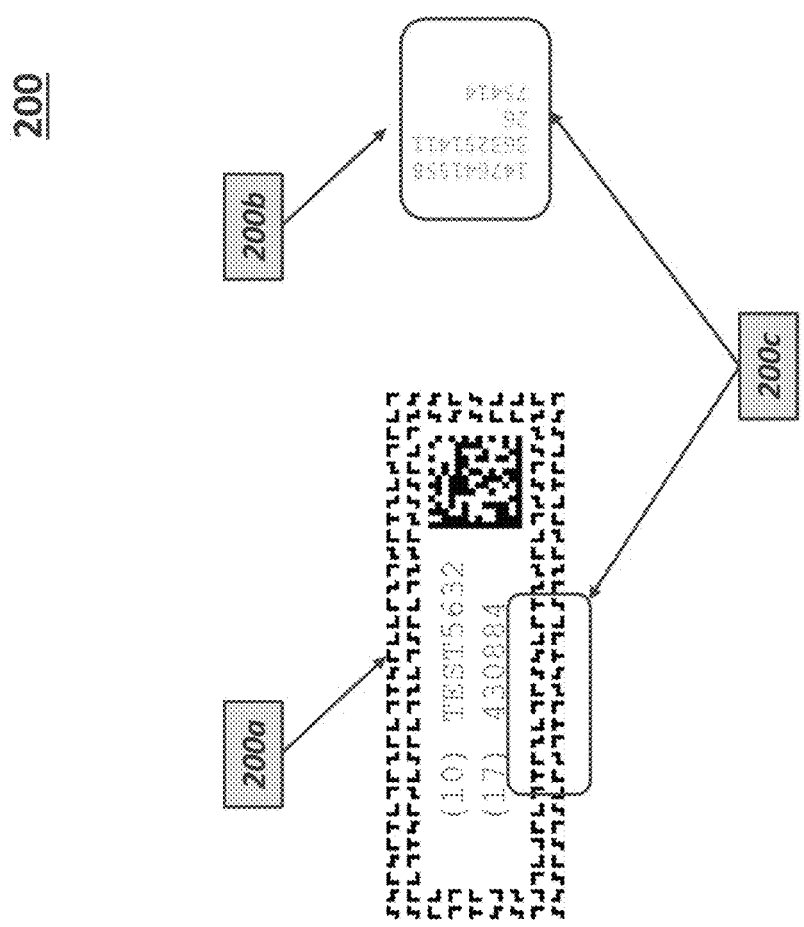
FIG. 14 shows two of many possible arrangements of symbols.
Figure 15A:
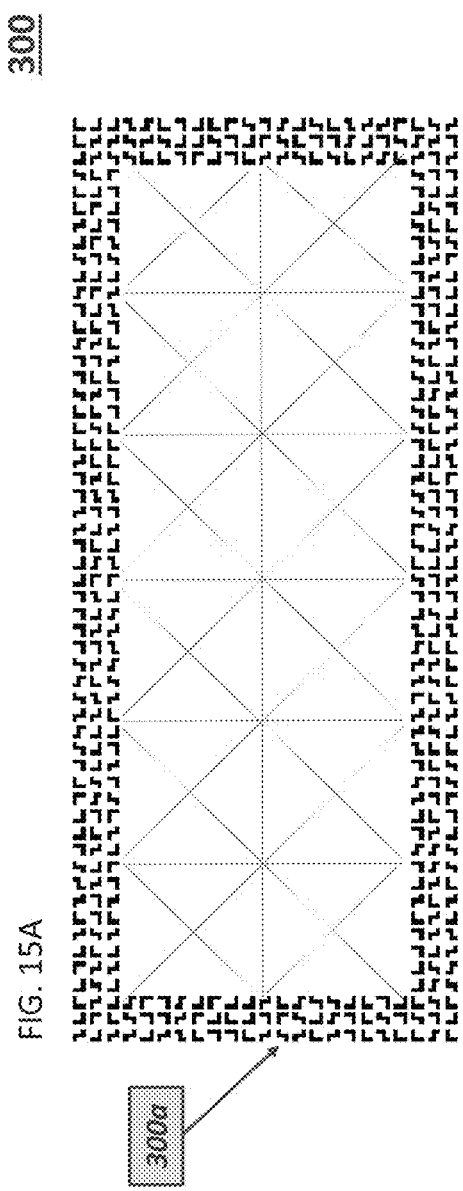
FIGS. 15A, 15B, and 15C illustrate graphical depictions of one or more authentication codes disclosed herein.
Figure 15C:
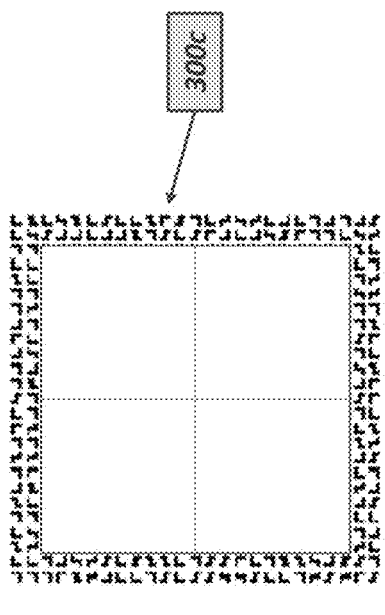
Figure 15B:
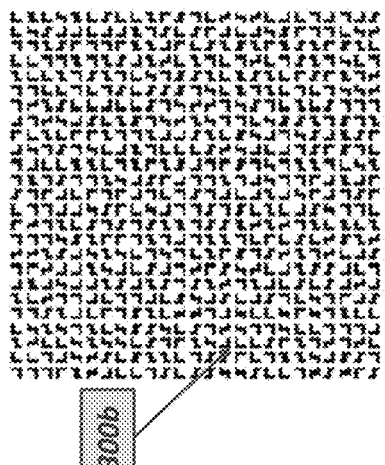

A fourth test, shown in FIGS. 11 through 12, includes printing the originals at 500 dpi and scanning the results at 300, 600, and 1200 dpi. The scanned images are the printed at 600 dpi and pictures were captured. For each print, multiple pictures were captured.

Data for one test is shown in TABLE III below:

TABLE III

Statistics for Good Images

| Variable | Mean | Std Dev | Maximum | Minimum |
|---|---|---|---|---|
| max | 4.263668 | 0.149375 | 4.434232 | 3.423575 |
| diff1 | 2.514372 | 0.155726 | 2.701631 | 1.778183 |
| diff2 | 3.292104 | 0.124647 | 3.438923 | 2.612651 |

*max is the average of all max values of 8 shapes.
*diff1 is the averaged difference between max and second max values.
*diff2 is the averaged difference between max and all other 7 shape values In furtherance, TABLE IV is provided below:

TABLE IV

Threshold = 3.42
Table of group by max

| | max | | |
|---|---|---|---|
| group | low | high | Total |
| bad | 253 | 561 | 814 |
| good | 0 | 716 | 716 |
| Total | 253 | 1277 | 1530 |

The minimum value of max, diff1, and diff2 were chosen as threshold to classify good and bad images.

TABLE V shows a group of diff1:

TABLE V

Threshold = 1.77
Table of group by diff1

| | diff1 | | |
|---|---|---|---|
| group | low | high | Total |
| bad | 248 | 566 | 814 |
| good | 0 | 716 | 716 |
| Total | 248 | 1282 | 1530 |

TABLE VI shows a group of diff1:

TABLE VI

Threshold = 2.61
Table of group by diff2

| | diff2 | | |
|---|---|---|---|
| group | low | high | Total |
| bad | 252 | 562 | 814 |
| good | 0 | 716 | 716 |
| Total | 252 | 1278 | 1530 |

Three statistics (max, diff1, and diff2) perform similarly effectively for classifying good and bad images. All good images are detected. Less than 1/3 of bad images are detected. Next, clustering was performed based on max and diff1 values without prior knowledge of the quality of images.

Figure 20:
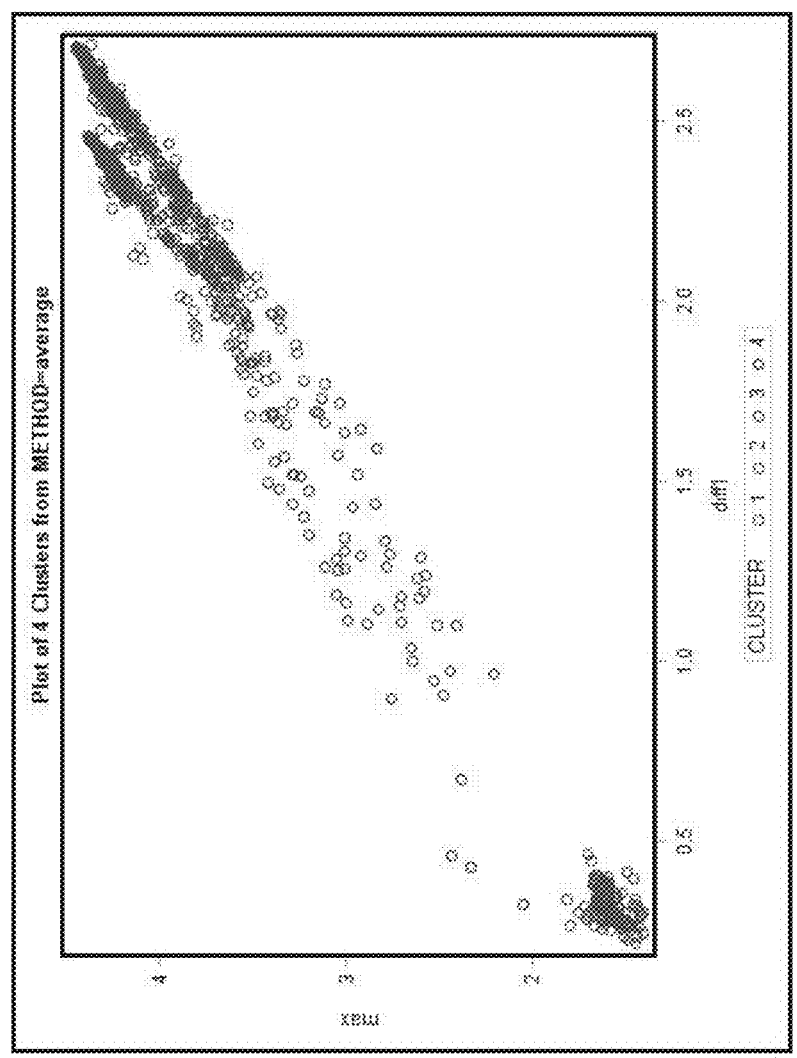
FIG. 20 illustrates various scatter plots associated with the methods disclosed herein.

All good images are classified to cluster 1. There are no good images in cluster 2, 3, and 4, which have similar effects to threshold classification. These results are shown in FIG. 20.

Figure 21:
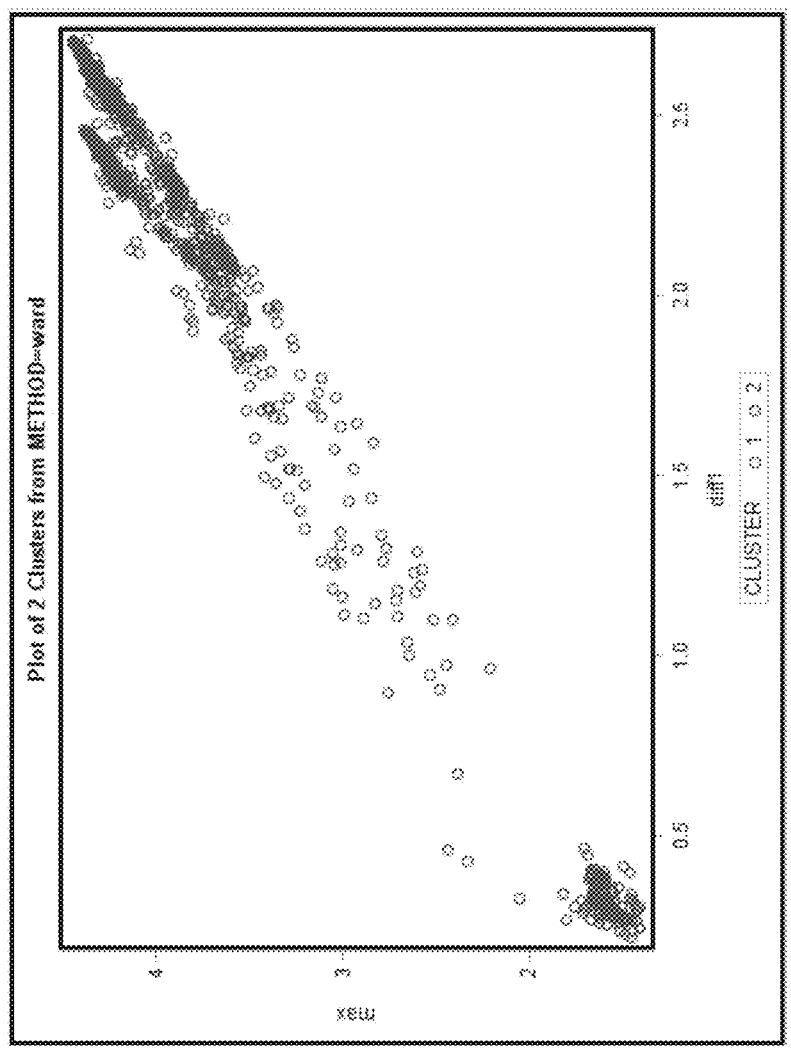
FIG. 21 illustrates various scatter plots associated with the methods disclosed herein.
Figure 22:
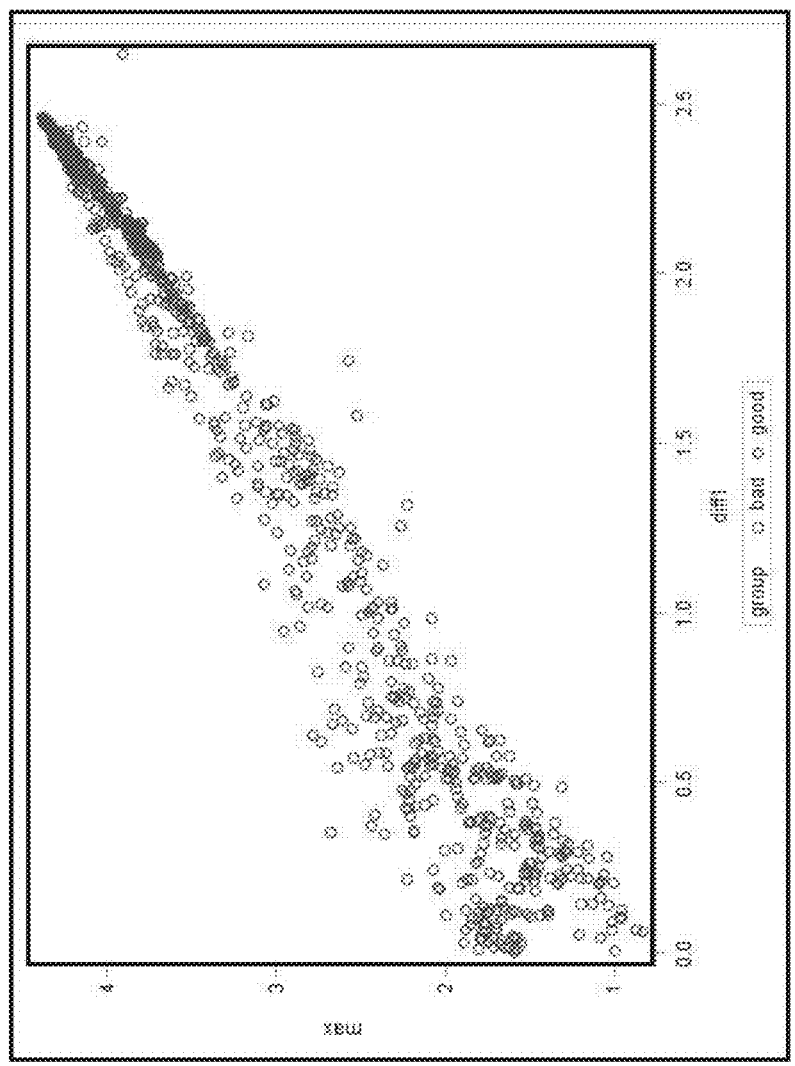
FIG. 22 illustrates various scatter plots associated with the methods disclosed herein.
Figure 23:
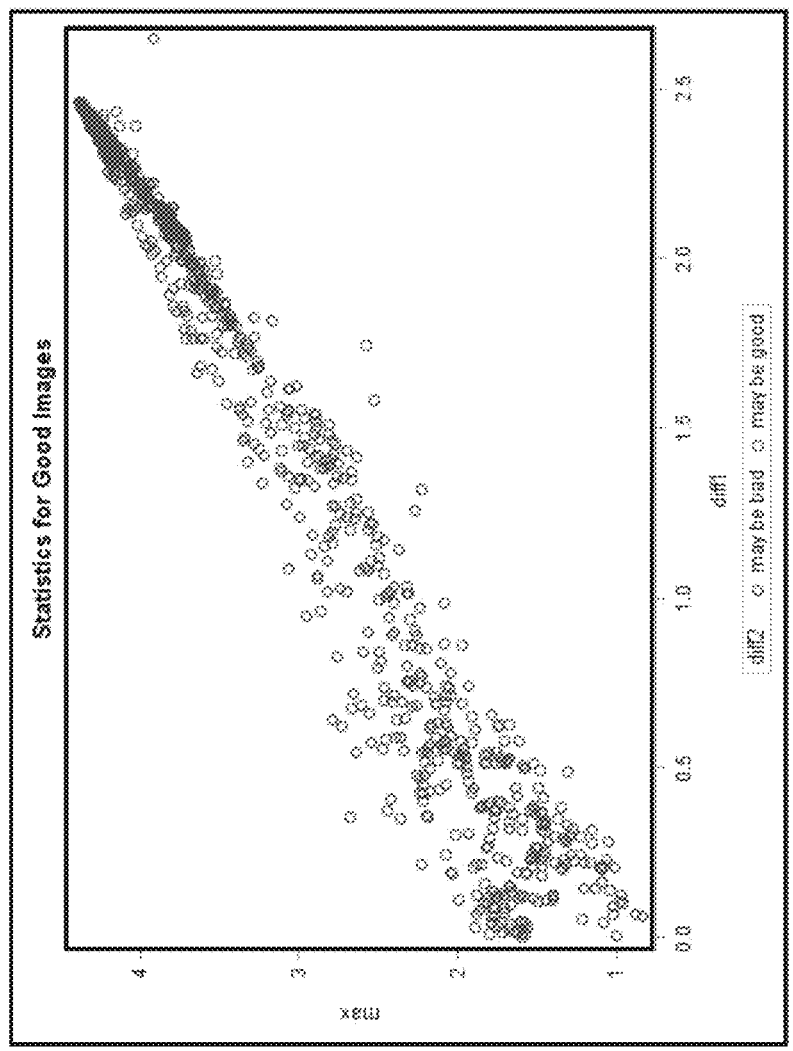
FIG. 23 illustrates various scatter plots associated with the methods disclosed herein.

Using Ward's minimum variance method, the clustering results are not very different from averaged distance method and threshold method, which also classified all good images into cluster 1. These results are shown in FIG. 21.

Validation of Clustering Method

TABLE VII shows grouping by max:

TABLE VII

Threshold = 3.42
Table of group by max

| | max | | |
|---|---|---|---|
| group | low | high | Total |
| bad | 436 | 309 | 745 |
| good | 5 | 402 | 407 |
| Total | 441 | 711 | 1152 |

TABLE VIII illustrates diff1:

TABLE VIII

Threshold = 1.77
Table of group by diff1

| | diff1 | | |
|---|---|---|---|
| group | low | high | Total |
| bad | 446 | 299 | 745 |
| good | 3 | 404 | 407 |
| Total | 449 | 703 | 1152 |

TABLE IX illustrates diff2:

TABLE IX

Threshold = 2.61
Table of group by diff2

| | diff2 | | |
|---|---|---|---|
| group | low | high | Total |
| bad | 442 | 303 | 745 |
| good | 5 | 402 | 407 |
| Total | 447 | 705 | 1152 |

Validation of Threshold Method

For different statistics in threshhold method, the misclassification of good images is approximately 1% among 407 and about 3/5 of bad images have been detected. The performance of the three statistics is similar.

The change number of records in each document was 50. TABLE X illustrates threshold values by max:

TABLE X

Threshold = 3.42
Table of group by max

| group | max | | |
|---|---|---|---|
| | low | high | Total |
| bad | 425 | 319 | 744 |
| good | 1 | 406 | 407 |
| Total | 426 | 725 | 1151 |

TABLE XI illustrates diff1:

TABLE XI

Threshold = 1.77
Table of group by diff1

| group | diff1 | | |
|---|---|---|---|
| | low | high | Total |
| bad | 425 | 319 | 744 |
| good | 0 | 407 | 407 |
| Total | 425 | 726 | 1151 |

TABLE XII illustrates diff2:

TABLE XII

Threshold = 2.61
Table of group by diff2

| group | diff2 | | |
|---|---|---|---|
| | low | high | Total |
| bad | 425 | 319 | 744 |
| good | 1 | 406 | 407 |
| Total | 426 | 725 | 1151 |

In this method, the images are separated into 7 categories (dark, light, focus_blur, linear_blur, rot, skew, and skew_blur) and the performance of each is tested under each category. The TABLES that follow show max values since all three statistics perform very similarly. TABLE XIII shows a summary:

TABLE XIII

Threshold = 3.42 Summary for Good Images
Table of category by max

| category | max | | |
|---|---|---|---|
| | low | high | Total |
| dark | 0 | 6 | 6 |
| focus_blur | 0 | 86 | 86 |
| light | 5 | 83 | 88 |
| linear_blur | 0 | 29 | 29 |
| rot | 0 | 102 | 102 |
| skew | 0 | 68 | 68 |
| skew_blur | 0 | 28 | 28 |
| Total | 5 | 402 | 407 |

TABLE XIV illustrates a summary for bad images:

TABLE XIV

Threshold = 3.42 Summary for Bad Images
Table of category by max

| category | max | | |
|---|---|---|---|
| | low | high | Total |
| dark | 0 | 114 | 114 |
| focus_blur | 4 | 54 | 58 |
| light | 45 | 35 | 80 |
| linear_blur | 266 | 39 | 305 |
| rot | 1 | 17 | 18 |
| skew | 61 | 30 | 91 |
| skew_blur | 59 | 21 | 80 |
| Total | 436 | 310 | 746 |

For good images, all misclassifications come from the light category. For bad images, none of the dark images have been detected. For 'rot' (i.e., rotation) and 'focus_blur', there are only less than 10% have been detected. The performance for 'linear_blur', 'skew' and 'skew_blur' is acceptable, 87%, 67%, and 74% have been detected, respectively.

Additional statistics may be used for separating more difficult to classify images. For example, while many scatterplots may illustrate an x=y relationship between various metrics, it is also possible that there may be multiple separate and identifiable relationships between the same metrics (e.g, x=y+offset) that may be associated with different image classifications. A decision tree or a neural network may also be used to provide a statistical measure of the shapiness or other characteristic of a captured image of a suspect document. The final three unlabeled figures illustrate aspects of using these methods.

Figure 16:
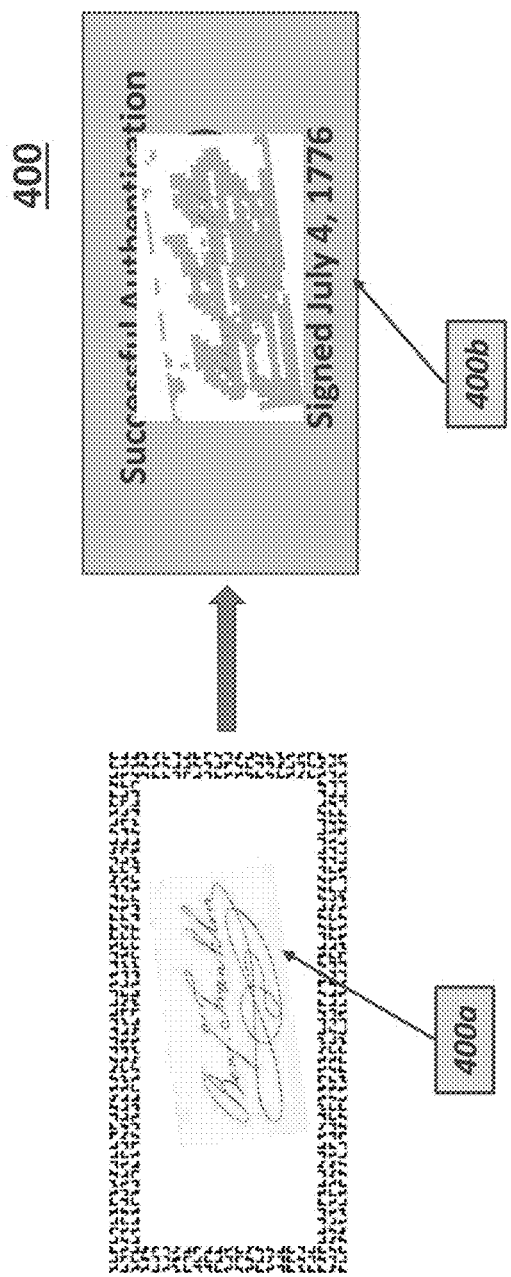
FIG. 16 shows a well-known example (400) of a user-specific mark, a personal signature, in this case, "Benj. Franklin" with a flourish.

The system may be configured to provide feedback to the user in an interactive authentication. The interactive authentication can provide the user with a response known only to the user, which response can be created by the user only at the time immediately preceding the authentication event. FIG. 16 shows a well-known example (400) of a user-specific mark, a personal signature, in this case, "Benj. Franklin" with a flourish. In this example, the user is prompted to sign somewhere in a border created by an arrangement of symbols. A successful authentication of that arrangement of symbols then feeds back to the user with the location of the user-specific mark, which may also include a time and date stamp for the authentication (second step of FIG. 16).

FIGS. 17A-17C show an alternative example (500) wherein a user provides a mark known only at the time immediately preceding the authentication event. In this example the user is prompted to add score marks on three of the guide marks as shown in FIG. 17A, FIG. 17B, and FIG. 17C. A successful authentication of that arrangement of symbols then feeds back to each of the users exemplified in FIG. 17A and FIG. 17B, with the location of the user-specific score marks. If the arrangement of symbols does not correspond to the authentic article, an authentication failure response is returned (FIG. 17C).

Two other exemplary configurations for user interactive authentication are shown in FIGS. 18A-18B (600).

In the example illustrated in FIG. 18A (600A), the user is prompted to add a mark of any time anywhere in an arrangement of symbols. A successful authentication of that arrangement of symbols then feeds back to the user is exemplified in FIG. 18A (600B), with the location and type of the user-specific mark.

In a second example illustrated in FIG. 18B (600C), the user is prompted to add a mark of any time anywhere in four quadrants within an arrangement of symbols. A successful authentication of that arrangement of symbols then feeds back to the user is exemplified in FIG. (600D), with only the quadrant location of the user-specific mark.

In either example illustrated in FIG. 18B, if the arrangement of symbols does not correspond to the authentic article, an authentication failure response is returned, by analogy to what was described for FIG. 17C (500C). Moreover, any of the examples recited in FIG. 17 (500) or FIG. 600) may also include a time and date stamp for the authentication, by analogy to what was shown in FIG. 16B (400B).

The second (or subsequent) registration signature can be used as a new original registration signature. In the examples of FIG. 16 (400), FIG. 17 (500), and FIG. 18 (600) the user-specific marks of a user-interactive authentication can become part of said second (or subsequent) registration signature. In such cases, an authentication comparator may be configured to receive a third (or corresponding subsequent) representation of such a new original registration signature. The authentication comparator may then compare the third (or corresponding subsequent) registration signature with the new original registration signature stored in the database and determine whether the third arrangement of symbols is authentic based on the comparison.

In the example illustrated in FIG. 19A (700), the new original registration signature and comparisons thereto described above are used after completion of a form. The form can be for monitoring patient adherence to an intended medications schedule, as illustrated in FIG. 19A (700A). The user or patient is prompted to add a mark in an arrangement of symbols corresponding to having taken medicine on the first day. A successful authentication of that arrangement of symbols then feeds back to the user as is exemplified in FIG. 19A (700B), with the location of the user-specific mark. The process described above can be repeated for subsequent authentications, in these subsequent cases more directed to monitoring progress in time than to authentication, per se. In this example, the user specific mark made, along with marks made on days 1-3 are shown in FIG. 19B (700C). "Authentication" results are shown in FIG. 19B (700D), wherein marks from previous days have been incorporated into prior day's registration signatures, such these can be distinguished from the fresh mark made on day 4. Additionally, an acknowledgement of full adherence to the protocol is indicated to the user or patient, in this case, a coupon for filling a next prescription.

The copy detect methodology can be further improved by taking advantage of multiple images of a suspect article. A limitation of the copy detect method is that from a single image, it is not always possible to discriminate the systematic differences between a copy and an original from random errors. Any individual image may contain random errors resulting from photographic noise (e.g., lighting or skew) or user error (e.g., motion blur that stems from users moving the camera during exposure time). However, because these are effectively random errors, error does not correlate across multiple images. The basic approach further can be categorized as "averaging these errors out" over a range of images. Hence, when multiple images of the same article are taken and processed together, averaging out the random errors tends to reduce them in favor of highlighting systematic differences between a copy and an original.

Figure 24A:
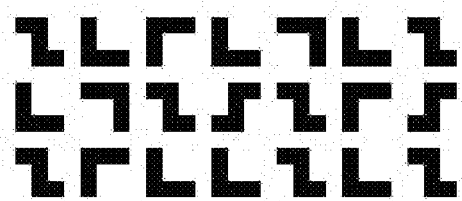
FIGS. 24A, 24B, 24C, 24D, 24E, and 24F illustrate the input images and resulting processed output from one embodiment of an example employing multiple images disclosed herein.
Figure 24B:
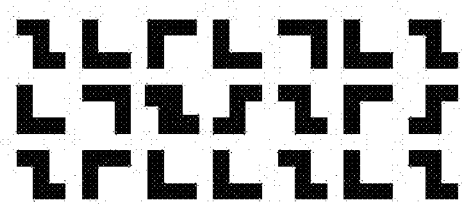
Figure 24C:
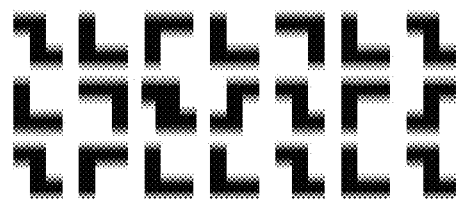
Figure 24D:
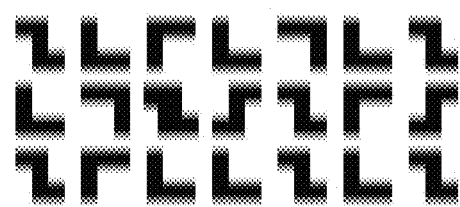
Figure 24E:
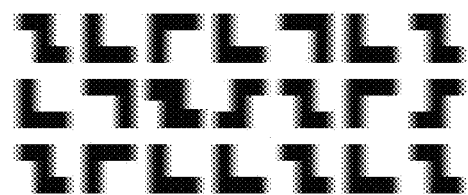
Figure 24F:
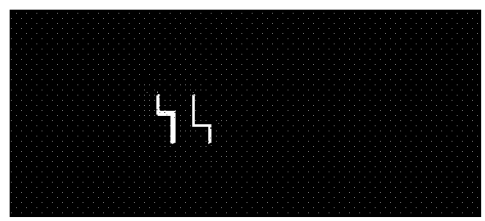

In the example illustrated by FIGS. 24A-F, we take a set of images of a article as in FIG. 24A with a defect or defects introduced through an attempt to copy an original article as in FIG. 24B. The defect may not be discernible to human vision. The defect is present in all images in the set, and each image in the set may have a different set random errors arising from the camera, the lighting conditions, or the user's methodology. A non-proper subset of these images is taken as a group. a sample group of such images is represented by FIGS. 24C-E. The set of images is processed to detect alignment features. In one embodiment, this is a barcode tracking mark. In another embodiment, this is a CertiRx TraxSecur mark. The set of image is processed to eliminate non-correlated errors appearing across each item in the set. In one embodiment, this processing is a simple image average over the set after each image is aligned. In another embodiment, a non-linear function is used to combine the images. In another embodiment, a machine based learning algorithm, such as a Hidden Markov Model or a Neural Network is used to combine the images. In all embodiments, after the images are combined, the resulting image is compared to the original article in the manner previously stated. The results of this processing include a highlight of errors suspected of defects as in FIG. 24F.

It is apparent to the skilled practitioner that without the alignment method of this invention, mere image averaging will not produce the same level of sensitivity toward detecting a copy versus an original.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

generating an ordered arrangement of symbols, wherein each symbol comprises a shapiness value, and wherein the shapiness value is a calculated value related to a similarity of one shape to another;

printing the arrangement of symbols on an original item;

capturing a representation of the arrangement of symbols after being printed on the original item;

generating an original registration signature based on the shapiness values of the captured arrangement of symbols;

storing the registration signature in a database;

receiving, at an authentication comparator, a second representation of a second registration signature based on a second arrangement of symbols, wherein each symbol comprises a shapiness value;

calculating a mathematical difference between the shapiness values of the second registration signature and the original registration signature; and determining whether the second arrangement of symbols is authentic based on the calculation.

2. The method of claim 1, wherein printing the arrangement of symbols on an original item includes printing the arrangement of symbols on one of a document, personal protective equipment, aircraft components, currency, or medical packaging.

3. The method of claim 1, further comprising determining a source of an item determined to be a copy of an original item.

4. The method of claim 1, further comprising comparing the second registration signature with the original registration signature which includes comparing one or more of a maximum, an average, and a mean with a predetermined threshold value.

5. The method of claim 1, further comprising comparing the second registration signature with the original registration signature, wherein the second registration signature is stored in a database for comparison to correspond to a third registration signature.

6. The method of claim 1, wherein printing the arrangement of symbols comprises:
using a printer preloaded with said symbols as a font, wherein the printer receives security instructions as to how to print the arrangement of symbols.

7. The method of claim 6, wherein the printer is selected from between the groups of physical printers or virtual printers.

8. The method of claim 6, wherein the method includes simultaneously sending the font with the instructions.

9. The method of claim 6, wherein the font includes formatting characters.

10. The method of claim 6, wherein said font includes variant characters as additional security features.

11. The method of claim 6, wherein the method includes sending simultaneously non-security instructions with the security instructions.

12. The method of claim 1, wherein the determining is based on statistical differences between multiple original registration signatures and multiple second registration signatures.

13. The method of claim 1, wherein the determining is based on a sum of differences between the shapiness values at each symbol location in the arrangement of symbols of the original registration signature and corresponding shapiness values at each symbol location in the arrangement of symbols of the second registration signature.

14. A method comprising:
generating an ordered arrangement of symbols, wherein each symbol comprises a shapiness value, and wherein the shapiness value is a calculated value related to a similarity of one shape to another;
printing the arrangement of symbols on an original item;
capturing a representation of the arrangement of symbols after being printed on the original item;
generating an original registration signature based on the captured arrangement of symbols;
storing the registration signature in a database;
instructing a user to modify said arrangement of symbols prior to authentication of said original item;
receiving, at an authentication comparator, a second representation of a second registration signature based on a second arrangement of symbols and user modifications thereto, wherein each symbol comprises a shapiness value;
calculating a mathematical difference between the shapiness values of the second registration signature and the original registration signature;
determining whether the second arrangement of symbols is authentic based on the calculation; and reporting results to the user to include information about user modifications.

15. The method of claim 14, wherein the user modifications are personal signatures.

16. The method of claim 14, wherein the user modifications are selected from among one or more of a score mark, a punch out, or a random mark.

17. The method of claim 14, wherein the user is instructed to make a second user modification after a previous authentication, wherein the second user modification is greater than the first modification of the arrangement of symbols.

18. The method of claim 17, wherein a system tracks a user event in time.

19. The method of claim 18, wherein the user event is medications adherence.

20. The method of claim 18, wherein the system delivers a message to the user upon successful completion of a protocol.

21. The method of claim 20, wherein the message includes a discount coupon for purchase of goods or services.

* * * * *